(12) United States Patent
Weston et al.

(10) Patent No.: US 12,714,983 B2
(45) Date of Patent: Aug. 25, 2026

(54) POLYMERIC SORBENT FIBER COMPOSITIONS INCORPORATING METAL ORGANIC FRAMEWORKS

(71) Applicants: ExxonMobil Technology and Engineering Company, Annandale, NJ (US); GEORGIA TECH RESEARCH CORPORATION, Atlanta, GA (US)

(72) Inventors: Simon C. Weston, Annandale, NJ (US); William J. Koros, Atlanta, GA (US); Wenying Quan, Marietta, GA (US); Ryan P. Lively, Atlanta, GA (US); Fengyi Zhang, Bartlesville, OK (US); Carter W. Abney, Athens, WI (US); Stephen J.A. DeWitt, Boston, MA (US); Matthew J. Realff, Atlanta, GA (US); Hannah E. Holmes, Atlanta, GA (US); Manjeshwar G. Kamath, Atlanta, GA (US)

(73) Assignees: ExxonMobil Technology and Engineering Company, Annandale, NJ (US); Georgia Tech Research Corporation, Atlanta, GA (US)

( * ) Notice: Subject to any disclaimer, the term of this patent is extended or adjusted under 35 U.S.C. 154(b) by 440 days.

(21) Appl. No.: 17/749,651

(22) Filed: May 20, 2022

(65) Prior Publication Data

US 2022/0370984 A1 Nov. 24, 2022

Related U.S. Application Data

(60) Provisional application No. 63/191,715, filed on May 21, 2021.

(51) Int. Cl.

*B01J 20/28* (2006.01)
*B01D 53/04* (2006.01)

(Continued)

(52) U.S. Cl.

CPC .... *B01J 20/28023* (2013.01); *B01D 53/0438* (2013.01); *B01J 20/226* (2013.01);

(Continued)

(58) Field of Classification Search

CPC .. B01J 20/28023; B01J 20/226; B01J 20/261; B01J 20/262; B01D 53/0438;

(Continued)

(56) References Cited

U.S. PATENT DOCUMENTS 8,133,308 B2 3/2012 Lively et al.
8,658,041 B2 2/2014 Koros (Continued)

FOREIGN PATENT DOCUMENTS

WO 2015/183831 A1 12/2015
WO WO-2019006045 A1 * 1/2019 ............ B01D 71/60

(Continued)

OTHER PUBLICATIONS

Hadi, A. et al., "Fabrication of ZIF-8/polyethersulfone (PES) mixed matrix hollow fiber membranes for O2/N2 separation," Materials Science, Engineering, Apr. 16, 2021.

(Continued)

*Primary Examiner* — Dung H Bui

(74) *Attorney, Agent, or Firm* — Troutman Pepper Locke LLP; John A. Morrissett; Scott A. Bergeson

(57) ABSTRACT

Fiber compositions are provided that incorporate metal organic framework (MOF) materials into the polymeric matrix of the fiber. The metal organic framework materials can be incorporated by including MOF particles into a "dope" or synthesis solution used to form the fiber. The dope solution can then be used to form fibers that include 5.0 wt % or more of MOF in the resulting polymeric structural material of the fiber, relative to a weight of the fibers. In (Continued)

some aspects, the metal organic framework material can correspond to a MOF with selectivity for adsorption of $CO_2$.

20 Claims, 16 Drawing Sheets

(51) Int. Cl.
*B01J 20/22* (2006.01)
*B01J 20/26* (2006.01)

(52) U.S. Cl.
CPC ........... *B01J 20/261* (2013.01); *B01J 20/262* (2013.01); *B01D 2253/202* (2013.01); *B01D 2253/204* (2013.01); *B01D 2253/34* (2013.01); *B01D 2257/504* (2013.01)

(58) Field of Classification Search
CPC ........ B01D 2253/202; B01D 2253/204; B01D 2253/34; B01D 2257/504; B01D 2253/25; B01D 2258/0283; B01D 53/02; Y02C 20/40
See application file for complete search history.

(56) References Cited

U.S. PATENT DOCUMENTS

| | | | | |
|---|---|---|---|---|
| 2002/0152889 | A1* | 10/2002 | Baker | B01D 71/44<br>95/45 |
| 2004/0099138 | A1* | 5/2004 | Karode | C07C 7/11<br>95/231 |
| 2007/0004023 | A1* | 1/2007 | Trachtenberg | B01D 63/026<br>435/297.2 |
| 2011/0011803 | A1 | 1/2011 | Koros | |
| 2012/0152117 | A1 | 6/2012 | Lively et al. | |
| 2012/0210870 | A1* | 8/2012 | Gerard | B01D 53/1487<br>95/45 |
| 2013/0313193 | A1 | 11/2013 | Nair et al. | |
| 2018/0043298 | A1* | 2/2018 | Liskey | B01D 69/107 |
| 2018/0200680 | A1* | 7/2018 | Sivaniah | B01D 67/0006 |
| 2018/0361326 | A1* | 12/2018 | Kuwana | B01D 71/64 |
| 2019/0022573 | A1* | 1/2019 | Weston | B01J 20/226 |
| 2019/0039015 | A1* | 2/2019 | Long | C07F 3/02 |
| 2019/0076819 | A1* | 3/2019 | Fujieda | B01J 20/28052 |
| 2019/0321787 | A1* | 10/2019 | Sivaniah | B01D 71/0281 |
| 2019/0375887 | A1* | 12/2019 | Swager | B01D 71/72 |
| 2020/0325295 | A1* | 10/2020 | Losego | B01D 69/148 |
| 2020/0391162 | A1* | 12/2020 | Zhu | B01D 69/12 |
| 2021/0023532 | A1* | 1/2021 | Greenbank | B67D 7/0492 |
| 2021/0039037 | A1* | 2/2021 | Greenbank | B01J 20/2804 |
| 2021/0060527 | A1* | 3/2021 | Hummersone | B01J 39/05 |
| 2021/0060899 | A1* | 3/2021 | Alamri | C08L 81/06 |
| 2021/0095122 | A1* | 4/2021 | Freeman | B01D 67/00091 |
| 2021/0162368 | A1* | 6/2021 | Thomson | B01D 53/0415 |
| 2021/0213421 | A1* | 7/2021 | Kanda | D01F 8/06 |
| 2022/0105454 | A1* | 4/2022 | Oishi | A61M 1/3679 |
| 2022/0134307 | A1* | 5/2022 | Sadiq | C09D 7/60<br>95/108 |
| 2022/0176343 | A1* | 6/2022 | Weston | B01D 53/02 |
| 2022/0184550 | A1* | 6/2022 | Liu | B01D 69/125 |
| 2022/0266219 | A1* | 8/2022 | Abney | C07F 3/02 |
| 2022/0306955 | A1* | 9/2022 | Koros | C10L 3/103 |
| 2022/0347654 | A1* | 11/2022 | Gray | B01D 53/62 |
| 2022/0370950 | A1* | 11/2022 | Weston | B33Y 80/00 |
| 2023/0001379 | A1* | 1/2023 | Zhao | B01D 71/06 |
| 2023/0087627 | A1* | 3/2023 | Kapelewski | B01J 20/28078<br>502/402 |
| 2023/0151028 | A1* | 5/2023 | Abney | C07F 13/005<br>556/45 |

FOREIGN PATENT DOCUMENTS

| | | | |
|---|---|---|---|
| WO | 2020/219907 | A1 | 10/2020 |
| WO | 2021001727 | A1 | 1/2021 |
| WO | 2020/256450 | A1 | 12/2022 |

OTHER PUBLICATIONS

International Search Report and Written Opinion in related PCT Application No. PCT/US22/30260, mailed Aug. 26, 2022.

International Preliminary Report on Patentability in related PCT Application No. PCT/US22/30260, mailed Nov. 21, 2023.

Lively, R.P. et al., "Hollow Fiber Adsorbents for CO2 Removal from Flue Gas", Ind. Eng. Chem. Res., 2009, vol. 48, pp. 7314-7324, Jun. 11, 2009.

Kosuri, M. R. et al., Defect-Free Asymmetric Hollow Fiber Membranes from Torlon®, a Polyamide-Imide Polymer, for High Pressure CO2 Separations, Journal of Membrane Science, vol. 320, Issues 1-2, Jul. 15, 2008, pp. 65-72.

Yi, S., et al. "Ultraselective Glassy Polymer Membranes with Unprecedented Performance for Energy-Efficient Sour Gas Separation," Science Advances, May 2019, vol. 5, No. 5, May 24, 2019.

Extended European Search Report and Opinion for European Patent Application No. 22805576.0 mailed Sep. 19, 2025.

Hu et al., "Matrix Membrane Hollow Fibers of Cu3(BTC)2 MOF and Polyimide for Gas Separation and Adsorption,", Industrial & Engineering Chemistry Research, Nov. 2010, vol. 49, No. 24, pp. 12605-12612.

Zhang et al., "Highly Scalable ZIF-based Mixed-matrix Hollow Fiber Membranes for Advanced Hydrocarbon Separations," Aiche Journal May 29, 2014, vol. 60, No. 7, pp. 2625-2635.

Office Action for Chinese Patent Application No. 2022800367530 issued Jun. 12, 2026.

* cited by examiner $NH_2OH$, THF

Stir at 69 °C for 20 hrs

PIM-1

AO-PIM-1

TZ-PIM-1

FIG. 2

Fiber 1

Fiber 5

Fiber 6

POLYMERIC SORBENT FIBER COMPOSITIONS INCORPORATING METAL ORGANIC FRAMEWORKS

CROSS REFERENCE TO RELATED APPLICATIONS

The present application is a non-provisional of, and claims priority under 37 C.F.R. § 119 to, U.S. Provisional Patent Application No. 63/191,715, filed May 21, 2021, the entire contents of which are fully incorporated herein by reference.

FIELD

Polymeric sorbent fiber compositions that incorporate metal organic framework materials are provided, such as hollow fiber compositions, along with methods of making such sorbent fiber compositions.

BACKGROUND

Mitigation of $CO_2$ emissions from various types of $CO_2$ sources (both industrial and small-scale) is an area of ongoing interest. One type of strategy for mitigation of $CO_2$ emissions is to use an adsorbent or absorbent to remove $CO_2$ from a potential emission gas flow, and then desorb the $CO_2$ as part of a stream that can be processed to reduce, minimize, or eliminate the release of $CO_2$ into the atmosphere.

Although a variety of materials are known that can adsorb or absorb $CO_2$, implementing such adsorbents/absorbents in an effective contactor structure remains a challenge. Some of the difficulties in designing contactor structures are related to limitations in the types of contactor designs that can be implemented using conventional materials. Traditional contactor designs have typically incorporated the adsorbents/absorbents as part of a packed bed or a monolith. Packed bed structures can be effective for incorporating a large quantity of adsorbent/absorbent into a volume. The particles in the packed bed can correspond to sorbent particles, mixtures of sorbent particles with binders or diluents, or particles made from a support material where the sorbent is deposited on the support. However, packed beds typically result in large pressure drops relative to the volume of fluid flow passing through the packed bed, making it difficult to scale packed bed adsorbers to large volumes for applications such as $CO_2$ capture. Metal or ceramic monoliths can provide an alternative to packed beds, and can provide flow channels that mitigate difficulties with pressure drop. However, the density of adsorbent sites that can be introduced on a metal or ceramic monolith is often limited to the surfaces of channels. Additionally, managing temperature within a monolith can pose a separate set of challenges. In particular, cooling of monolith structures typically requires introducing a heat transfer fluid into the interior of the monolith. Due to difficulties in machining complex structures in ceramic or metal monoliths after formation, it can be difficult to provide target amounts of heat transfer fluid to the interior of a monolith structure while still reducing or minimizing the risk of mixing of the heat transfer fluid with the process fluid flows.

An alternative to using packed beds or monolith structures is to use an array of sorbent hollow fibers. For example, adsorbents can be incorporated into the polymer material of a sorbent hollow fiber, and then a barrier layer can be added to the central bore. A plurality of the fibers can be arranged into a contactor. The barrier layer can prevent fluid communication between the hollow bores of the fibers and the remaining portions of the polymeric material. This can allow the hollow bores to be used to carry heat transfer fluids, to allow for temperature management of the hollow fiber array. This temperature management can be used to assist with adsorption and desorption of a desired target component, such as $CO_2$. Adsorption can be performed by exposing the exterior of the hollow fibers to a process gas containing the target component (such as $CO_2$), and then desorption can be performed by heating the fibers in the presence of a sweep gas.

U.S. Pat. No. 8,133,308 describes examples of an adsorption contactor based on a hollow fiber array using fibers formed from mixtures of cellulose acetate and zeolite adsorbent. A method is also described for using a humidified sweep gas during formation of a lumen barrier layer. An article titled "Hollow Fiber Adsorbents for $CO_2$ Removal from Flue Gas", (Ind. Eng. Chem. Res., 2009, Vol. 48, pages 7314-7324) also describes use of a humidified sweep gas during lumen layer formation.

While adsorbents can be incorporated into the dope solution used for formation of hollow fibers, merely incorporating such adsorbents does not guarantee that the full adsorption capacity of the adsorbent will be maintained in the resulting hollow fiber structure. It would be desirable to incorporate adsorbents with higher adsorption capacities into hollow fiber structures at substantial loadings while still retaining the beneficial adsorption properties of such adsorbents.

U.S. Pat. No. 8,658,041 describes additional examples of hollow fiber contactor structures. A hollow fiber is a fiber that includes a central bore or lumen. In the contactor structures, a hollow fiber can include adsorbents in the polymeric material and can further include a barrier layer to prevent fluid exchange between the polymeric material and the central bore or lumen.

An article titled "Defect-Free Asymmetric Hollow Fiber Membranes from Torion®, a Polyamide-Imide Polymer, for High Pressure $CO_2$ Separations" (Kosuri, M. R., Koros, W. I, Journal of Membrane Science, 2008, 320, 65) describes determining the binodal line of a ternary phase diagram via the cloud-point method.

An article titled "Ultraselective Glassy Polymer Membranes with Unprecedented Performance for Energy-Efficient Sour Gas Separation (Science Advances, May 2019, Vol. 5, No. 5, eaaw5459) describes AO-PIM-1, a polymer of intrinsic microporosity.

SUMMARY

In an aspect, a sorbent hollow fiber composition is provided. The sorbent hollow fiber composition includes a hollow fiber, the hollow fiber including a polymeric structural material, the polymeric structural material including a polymer and 5.0 wt % to 80 wt % of a metal organic framework material relative to a weight of the polymeric structural material. Additionally, the sorbent hollow fiber composition includes a bore within the hollow fiber.

In another aspect, a sorbent fiber composition is provided. The sorbent fiber composition includes a fiber, the fiber including a polymeric structural material, the polymeric structural material including a polymer and 5.0 wt % to 80 wt % of a metal organic framework material relative to a weight of the polymeric structural material.

In some aspects, the polymer can correspond to a polymer of intrinsic microporosity, such as AO-PIM-1. In some aspects, the polymer can correspond to polyethersulfone. In some aspects, the polymer can include a polymer backbone that comprises at least a portion of one or more ring structures.

In some aspects, the metal organic framework material can include one or more appended amines Such amines can optionally be appended to the metal organic framework material after formation of the hollow fiber.

In an aspect, a method for forming a fiber composition, such as a sorbent hollow fiber composition, is provided. The method can include forming a fiber by extruding a dope solution or forming a hollow fiber by extruding a bore fluid and a dope solution. The dope solution can include a metal organic framework material, a polymer, and a solvent. The fiber or hollow fiber can be composed of a polymeric structural material including the polymer and 5.0 wt % to 80 wt % of the metal organic framework material relative to a weight of the polymeric structural material. The hollow fiber can further include a bore within the hollow fiber.

Optionally, the method can further include exposing the hollow fiber to a solution containing an amine to convert at least a portion of the metal organic framework materials to amine-appended metal organic framework materials Optionally, the method can further include forming a barrier layer at an interface between the bore and the polymeric structural material. For example, a barrier layer can be formed by passing a barrier polymer and a carrier gas through the bore to form a barrier layer at an interface between the bore and the polymeric structural material. Optionally, the carrier gas can include 0.5 vol % or less of $H_2O$.

BRIEF DESCRIPTION OF THE DRAWINGS

FIG. 2 shows examples of chemical structures for various polymers of intrinsic microporosity.

DETAILED DESCRIPTION

Figure 1:
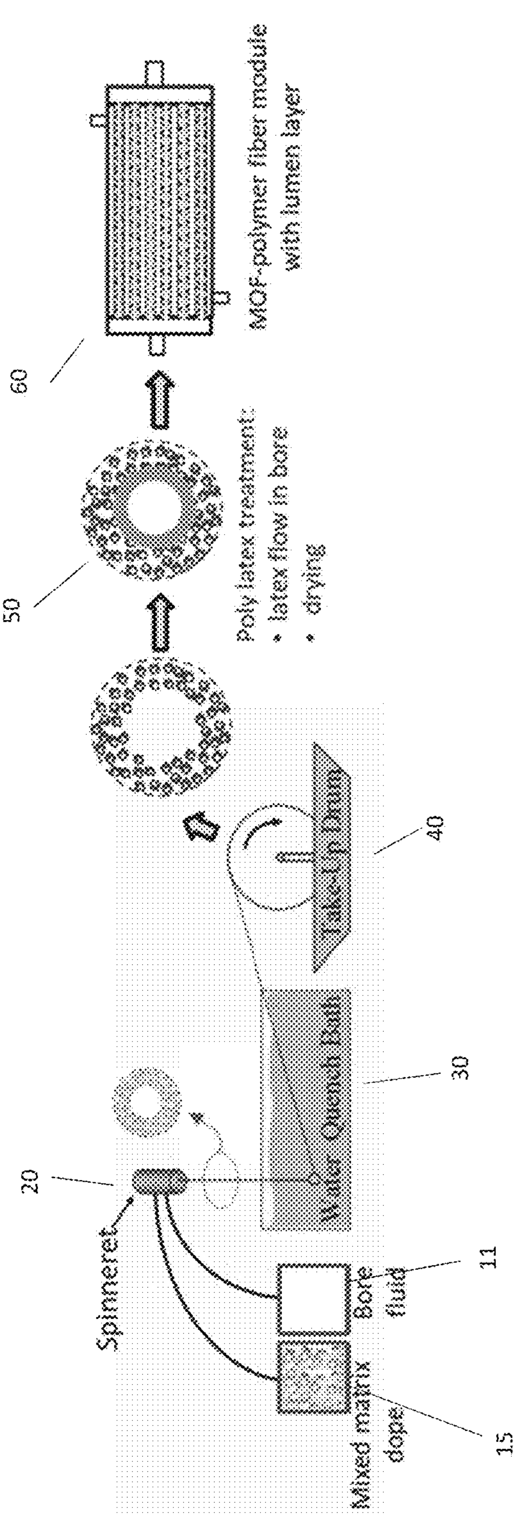
FIG. 1 shows an example of an process flow for forming sorbent hollow fibers.

All numerical values within the detailed description and the claims herein are modified by "about" or "approximately" the indicated value, and take into account experimental error and variations that would be expected by a person having ordinary skill in the art.

Overview

In various aspects, fiber compositions are provided that incorporate metal organic framework (MOF) materials into the polymeric matrix of the fiber. Hollow fiber compositions are an example of a fiber composition. Metal organic framework materials can be incorporated by including MOF particles into a "dope" or synthesis solution used to form the hollow fiber. The dope solution can then be used to form fibers (such as hollow fibers) that include 5.0 wt % or more of MOF in the resulting polymeric structural material of the fiber, relative to a weight of the fibers. In some aspects, the metal organic framework material can correspond to a MOF with selectivity for adsorption of $CO_2$.

Additionally or alternately, in various aspects, after incorporating MOF materials into a fiber composition, the MOF materials can be at least partially converted into amine appended MOF materials. It has been discovered that amine-appended MOF materials cannot be directly incorporated into a fiber structure. Instead, during fiber formation, the appended amines can be substantially stripped from the MOF material during one or more phases of the fiber formation process. Instead of attempting to directly form fiber compositions (such as hollow fiber compositions) including an amine-appended MOF material, it has been discovered that a fiber containing a MOF material can first be formed, and then amine appending can be performed on the resulting fiber structure.

The fiber compositions can correspond to a polymeric structural material with MOF material supported in the polymeric matrix. Generally, the polymeric structural material can have sufficient pore volume and/or pore channels to allow for transport of fluids from the exterior surface of a hollow fiber to the interior of the polymeric matrix. In aspects where a hollow fiber composition is formed so that a bore or lumen is present in the hollow fiber, a barrier or lumen layer can be included to reduce, minimize, or prevent movement of fluids between the polymeric matrix material and the interior bore volume. Such a barrier can allow, for example, a heat transfer fluid to be passed through the bore volume/lumen volume while reducing, minimizing, or avoiding mixing of the heat transfer fluid with a process fluid.

Generally, a variety of types of polymers have previously been used to form hollow fibers (or more generally fibers). However, incorporation of materials into a dope solution can interact with the polymer. It has been discovered that some classes of polymers can provide unexpected benefits when used in a dope solution that also includes a MOF for incorporation into a fiber structure. One class of polymers that can be used are polymers of intrinsic microporosity (PIM), such as PIM-1 or other variations on the PIM-1 structure. More generally, polymers including at least a portion of one or more ring structures (either aromatic or non-aromatic) in the polymer backbone can be used. Polyethersulfone (PES) is another example of a polymer including ring structures in the polymer backbone. Cellulose acetate is still another example of a polymer that includes (non-aromatic) ring structures in the polymer backbone. Yet other examples can include polyimines (such as Matrimid 5218) and/or polyamide-imide polymers (such as Torlon®). In this discussion, at least a portion of a ring structure is defined as being part of the polymer backbone when the shortest path for connecting the atoms at the ends of a polymeric repeat unit passes through one or more atoms participating in a ring structure. In some aspects, a polymer backbone can include a plurality of atoms participating in a single ring structure.

Additionally or alternately, it has been unexpectedly discovered that the amount of MOF that can be incorporated into a fiber can depend on the nature of the polymer used to form the polymeric structural material of the fiber. When MOF materials are incorporated into a fiber to increase the $CO_2$ adsorption capacity of the fiber, it is beneficial to be able to increase the weight percentage of MOF that can be incorporated into the polymeric structural material. In some aspects, the amount of MOF material that can be incorporated into the polymeric structural material can be increased by forming the polymeric structural material from a polymer corresponding to AO-PIM-1, polyethersulfone, or a combination thereof.

In various aspects, the $CO_2$ adsorption capability of a fiber (such as a hollow fiber) can be increased by incorporating a metal-organic framework material into the polymeric matrix. Metal-organic frameworks (MOFs) are a relatively new class of porous materials that are comprised of metal ion/oxide secondary building units interconnected by organic linking ligands through covalent bonds. MOFs are characterized by low densities, high internal surface areas, and uniformly sized pores and channels. MOFs are typically crystalline materials.

A variety of MOFs have been characterized as having $CO_2$ adsorption capabilities. For example, Mg-MOF-74 corresponds to a metal organic framework material based on $Mg^{2+}$ ions and 2,5-dihydroxyterephthalic acid. As another example, EMM-67 corresponds to a metal organic framework material based on metal ions coordinated with 4,4'-dioxidobiphenyl-3,3'-dicarboxylate. This material can be further enhanced by appending functionalities like 2-aminomethylpiperidine to produce structures such as EMM-44. As still another example, EMM-42 is a metal organic framework composed of trigonal nodes of 3 chromium atoms and at least 13 oxygen atoms that are bridged by a combination of benzene-dicarboxylate ligands and phenylene-bisphosphonic acid linking ligands in the MTN (IZA code) topology. Still another example is HKUST-1, also referred to as MOF-99. The HKUST-1 framework is built up of dimeric metal units, which are connected by benzene-1,3,5-tricarboxylate linker molecules. The paddlewheel unit is the commonly used structural motif to describe the coordination environment of the metal centers and secondary building unit (SBU) of the HKUST-1 structure. The paddlewheel is built up of four benzene-1,3,5-tricarboxylate linkers molecules, which bridge two metal centers. It is noted that HKUST-1 is a water sensitive MOF. In some aspects, when forming a dope solution that includes a water sensitive MOF, the solvent (and any optional non-solvent) can be substantially free of water. In some aspects, the MOF can correspond to a MOF that includes a disalicylate linker.

More generally, any type of MOF that can be formulated as MOF particles can be used for incorporation into the polymeric structural material of a fiber as described herein. The MOF particles can have an average size of between 0.01 μm to 50 μm, or 0.1 μm to 50 μm. The size of an MOF particle is defined herein as the diameter of the smallest bounding sphere that can contain the particle.

In various aspects, the polymeric structural material of a fiber can incorporate 1.0 wt % to 80 wt % of MOF material, or 1.0 wt % to 50 wt %, or 1.0 wt % to 35 wt %, or 1.0 wt % to 30 wt %. In some aspects, the MOF content of the polymeric structural material can be relatively low. In such aspects, the MOF content of the polymeric structural material can be 1.0 wt % to 35 wt %, or 5.0 wt % to 35 wt %, or 10 wt % to 35 wt %, or 1.0 wt % to 30 wt %, or 5.0 wt % to 30 wt %, or 10 wt % to 30 wt %, or 1.0 wt % to 20 wt %. In other aspects, higher loadings of MOF material can be included in the polymeric structural material. In such aspects, the MOF content of the polymeric structural material can be 30 wt % to 80 wt %, or 30 wt % to 70 wt %, or 50 wt % to 80 wt %, or 50 wt % to 70 wt %.

In some aspects, a pore forming component can be used to promote a beneficial pore structure in the polymeric structural material. Pore forming components can be added to dope solutions to reduce or minimize the formation of macrovoids within a polymeric structural material. Pore forming components can be added to a dope solution independent of whether the dope solution also contains a non-solvent.

After forming a hollow fiber, a barrier layer or lumen layer can be added to the inner wall of the hollow fiber to reduce, minimize, or eliminate fluid communication between the bore of the hollow fiber and the polymeric structural material. This can allow the bore to be used as a conduit for heat transfer fluid while reducing, minimizing, or avoiding mixing of such a heat transfer fluid with a process gas that is exposed to the polymeric structural material of the hollow fiber. Additionally or alternately the barrier layer can be introduced during extrusion. For example, a three-channel spinneret can be used that allows for co-extrusion of a barrier layer. In some aspects, a barrier layer dope solution can be used that contains 10-50% polymer and the balance solvent, such as NMP. The bore fluid composition can be tuned accordingly and may contain 0-100% polypropylene glycol, or another convenient combination of solvent and/or non-solvent. In such aspects, a dope solution, a barrier layer dope solution, and a bore fluid can be co-extruded to produce hollow fibers with a barrier layer at the interface between the bore and the sorbent material.

Composition of Dope Solution

In various aspects, a dope solution (or synthesis solution) for forming a polymeric fiber structure that includes MOF adsorbents can include at least one solvent, at least one non-solvent and/or pore former, a polymeric material dissolved in the solvent, and particles of a MOF material dispersed and/or suspended in the solution. It has been discovered that metal organic framework particles can be incorporated into a dope solution to allow for formation of fibers that include MOF in the polymeric structural material. Formation of such fiber structures can be further facilitated by selecting a polymer that allows for higher concentrations of MOF material in the resulting fiber.

Hollow fibers are an example of a fiber structure. In this discussion, use of dope solutions to form hollow fibers is described to illustrate the nature of the invention. However, it is understood that other types of fibers can be formed by following a similar procedure while omitting use of a bore fluid.

Extrusion of polymers to form hollow fiber sorbents composed of polymeric structural material is conventionally known. One suitable extrusion method is a jet dry-wet spinning method, using a core dope and a bore fluid. In such a method, a dope solution and a bore fluid can be fed to a spinneret. The dope solution can include polymer, solvent, and optionally one or more of a non-solvent or a pore former. Conventionally, a non-solvent would be included in the dope solution, but in some aspects, a dope solution of i) MOF particles, polymer, and solvent or ii) MOF particles, polymer, solvent, and a pore former, can be used to form hollow fibers. The spinneret can be used to extrude a hollow fiber structure. In aspects where a non-solvent is used, during and/or after extrusion, the ratio of solvent to non-solvent can be modified to cause a phase inversion, resulting in formation of the porous hollow fiber. Additionally or alternately, formation of the hollow fiber can occur by passing the extruded material into a quench bath to facilitate removal of solvent and formation of the hollow fiber. As noted above, if a bore fluid is not used, a similar fiber can be formed that is not hollow.

For dope solutions including a polymer, solvent, and non-solvent, a ternary phase diagram can be determined based on the polymer, solvent, and non-solvent that will be used to form a dope solution. This ternary phase diagram for the polymer, solvent, and non-solvent will include a binodal line that separates a homogeneous (solution) region from a non-homogeneous region where the polymer forms a separate phase from the solvent and non-solvent. This binodal line in the ternary phase diagram can be determined by any convenient method, such as by using a "cloud-point" method. For example, at a fixed concentration of polymer, a series of compositions can be formed with successively lower ratios of solvent to non-solvent to determine the composition (or compositions) having a "cloudy" appearance due to the onset of separation into separate polymer and solvent/non-solvent phases. This process can be repeated at a series of polymer concentrations to determine the binodal line. Another example of a method for determining a binodal line is provided in Kosuri et al. (Kosuri, M. R., Koros, W. I. Journal of Membrane Science, 2008, 320, 65). It is noted that phase diagrams can similarly be formed for combinations of polymer, solvent, and pore former to assist with selection of a dope solution composition.

In various aspects, alternative types of dope solutions can be identified by using a mixture of polymer and MOF particles as one component for determining the ternary phase diagram. However, while such phase diagrams can be used to determine dope solutions that are sufficiently close to a binodal line to allow for polymeric structural material by phase inversion, it has been discovered that the ability to incorporate MOF particles is separate from the ability to form (hollow) fiber structures with high loadings and/or while retaining high $CO_2$ adsorption capacity for the MOF particles.

Figure 2:
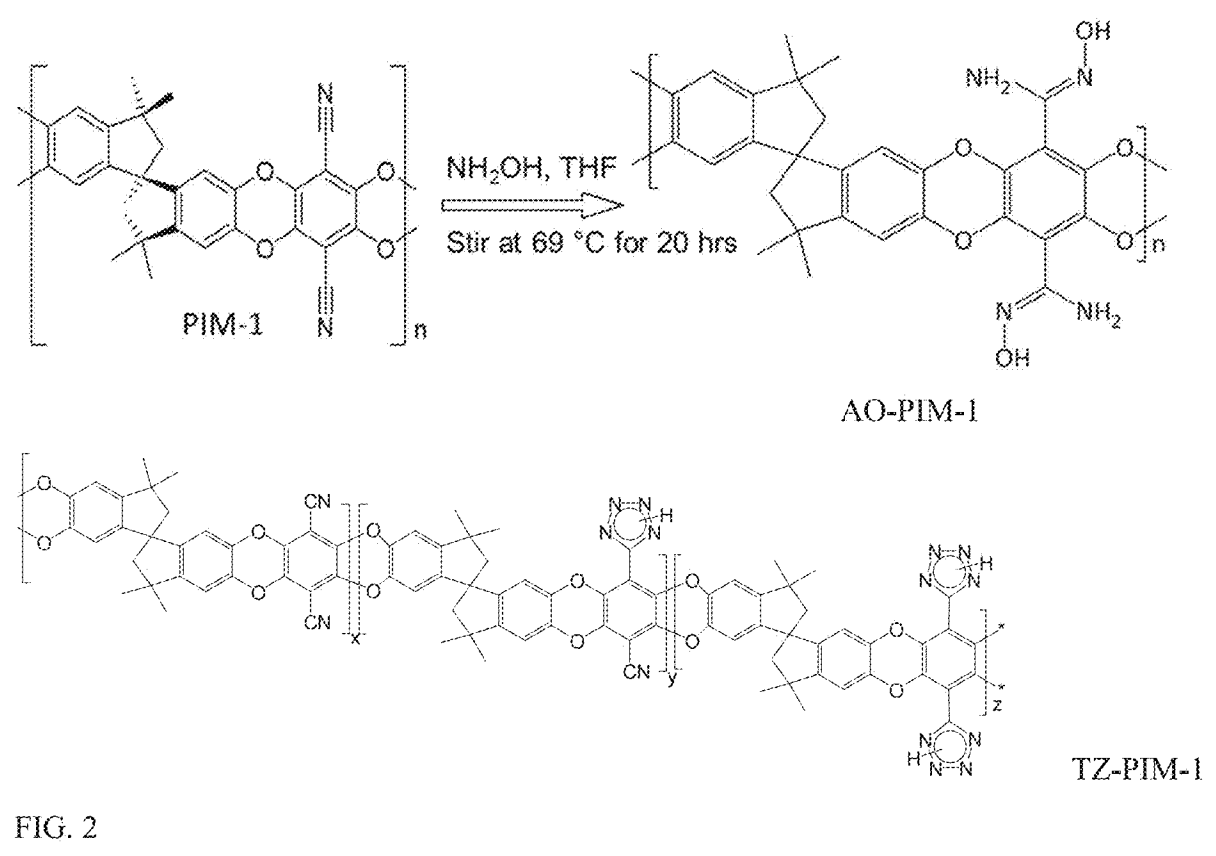

In some aspects, the polymer used to form the polymeric structural material of the hollow fiber can correspond to a polymer of intrinsic micorporosity (PIM). FIG. 2 shows examples of repeat units for three types of PIMs. The top portion of FIG. 2 shows a reaction for converting PIM-1 into a polymer referred to herein as AO-PIM-1. AO-PIM-1 corresponds to an amidoxime derivative of PIM-1. As shown in FIG. 2, AO-PIM-1 can be formed, for example, by reacting PIM-1 with hydroxylamine in a solution environment. Examples of suitable solution environments can include polar aprotic solvents, such as tetrahydrofuran or dimethylformamide, although other types of solvents can also potentially be suitable. Although AO-PIM-1 was developed as a polymeric material for adsorption of $CO_2$, it has been discovered that AO-PIM-1 can allow for incorporation of unexpectedly high levels of MOF materials while still being formed by spinning from a dope solution. Additionally, it is believed that the high levels of MOF materials within the AO-PIM-1 polymeric structural material can retain 80% or more, or 90% or more, of the $CO_2$ adsorption capacity of the MOF materials. Additionally, FIG. 2 shows the structure of another PIM-1 derivative referred to herein as TZ-PIM. TZ-PIM can be formed by converting the nitrile group in PIM-1 into a tetrazole.

Figure 3:
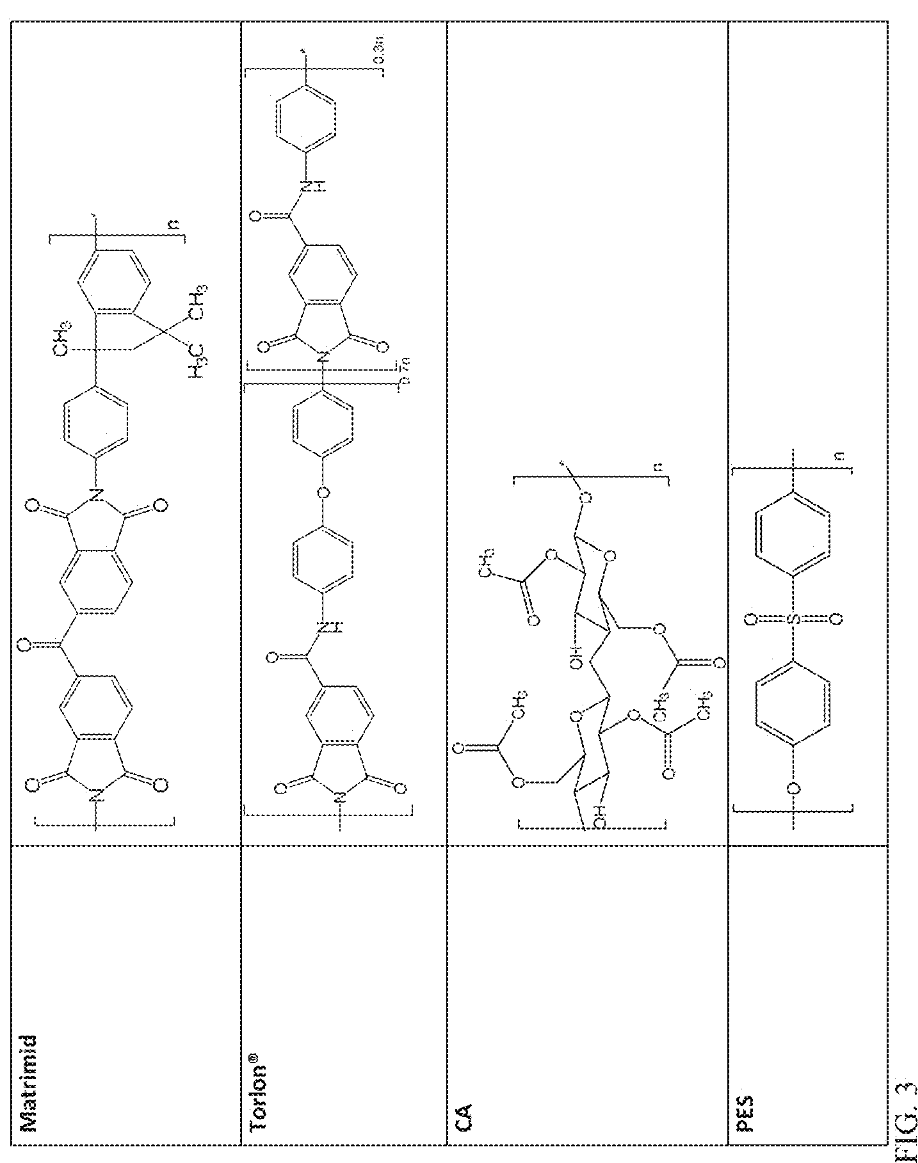
FIG. 3 shows chemical structures for various polymers.

Other types of polymers can also be used to form a dope solution. In some aspects, the polymer in a dope solution can include, but is not limited to, polymers of intrinsic microporsity, cellulose acetate, and polysulfones (such as polyethersulfones). In some aspects, the polymer can correspond to a polymer that includes at least one ring structure in the polymer backbone. In some aspects, the polymer can correspond to a polymer that is insoluble in water. FIG. 3 shows repeat units for examples of other types of polymers that were used to form a polymeric structural material in examples provided herein. The repeat units shown in FIG. 3 correspond to Matrimid® 5218, a Torlon® polymer, cellulose acetate, and a polyethersulfone. It is noted that dope solutions containing a plurality of polymers can also be formed, to allow for formation of fibers composed of a plurality of polymers.

In some aspects, the solvent can correspond to tetrahydrofuran, acetone, and/or N-methyl pyrrolidone. More generally, the solvent can be a solvent that has high solubility for the polymer in the dope solution. There exist many methods for determining level of solubility of the polymer in the solvent compound. For example, in some aspects, the Hildebrand solubility parameters can be determined for the polymer and the solvent compound. In some embodiments, the Hildebrand solubility parameters of the polymer and the solvent compound can have a difference of 3.6 $MPa^{1/2}$ or less. As would be appreciated by one of ordinary skill in the art, such an embodiment would provide a solvent compound which would be able to dissolve the polymer to create a substantially homogeneous solution. Depending on the aspect and the nature of the polymer, potential solvents can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

In some aspects, it may be sufficient to have just polymer, MOF, and solvent in the dope solution. In other aspects, the dope solution can further include a non-solvent. Generally, the non-solvent can be a compound that has low or minimal solubility for the polymer in the dope solution. There exist many methods for determining level of solubility of the polymer in the non-solvent compound. In some aspects, the non-solvent can be selected by first determining the Hansen solubility parameters for the polymer and the non-solvent compound. For example, a polymer and non-solvent can be selected so that the Relative Energy Difference calculated from the Hansen solubility parameters of the polymer and the nonsolvent compound can be 1 or greater. As would be appreciated by one of ordinary skill in the art, such an embodiment would provide a nonsolvent compound which would be unable to dissolve the polymer.

In some aspects, the non-solvent can correspond to toluene, dimethyl acetamide, or combinations thereof. In some aspects, the non-solvent can correspond to water and/or can include water. In other aspects, the non-solvent can be substantially free of water (less than 0.1 wt %), which can allow a water-sensitive MOF to be used in the ink composition. HKUST-1 is an example of a water-sensitive MOF.

Optionally, a dope solution can include a pore forming component. A pore forming component can be used in addition to and/or in place of a non-solvent. Lithium nitrate is an example of a pore forming component.

Table 1 shows examples of combinations of polymer, solvent, and either non-solvent or pore forming component that can be used to form a dope solution for hollow fiber formation. In Table 1, $LiNO_3$ is listed in the "non-solvent" column, but it is understood that $LiNO_3$ serves as a pore forming component rather than as a non-solvent. It is noted that PVP (polyvinyl pyrrolidone) is another compound that may be suitable for use as a pore forming component.

TABLE 1

Polymer, Solvent, and Non-Solvent Combinations

| Polymer | Solvent | Non-Solvent |
| --- | --- | --- |
| PIM-1 | THF, $CH_2Cl_2$, $CHCl_3$ | DMAc, DMF, DMSO, water, methanol, ethanol, ethyl acetate, acetonitrile, toluene |
| CA | Acetone, NMP | Water, Butanol, n-Propanol, isopropanol, ethanol, methanol, acetonitrile, ethyl acetate, toluene |
| PES | DMAc, DMF, NMP | Isopropyl Myristate; 1,2,4-trichlorobenzene; o-Dichlorobenzene; water; $LiNO_3$** |
| Matrimid | DMAc, DMF, THF, $CH_2Cl_2$, $CHCl_3$, NMP | Water, alcohols, ethyl acetate, toluene, $LiNO_3$ |

In this discussion, surface area and pore volume for a polymer structure formed can be determined by measuring $N_2$ adsorption isotherms according to ASTM D3663 (BET surface area) and ASTM D4641 ($N_2$ pore volume), respectively. Where specified, pore volumes can also be determined according to ASTM D4284 (Hg porosimetry for pore volume).

In some aspects, a polymeric structure can have a surface area of 50 $m^2/g$ or more, or 100 $m^2/g$ or more, or 200 $m^2/g$ or more, or 500 $m^2/g$ or more, such as up to 3000 $m^2/g$ or possibly still higher. It is noted that such surface areas and/or pore volumes include surface area and pore volume contributions from both the polymer and the MOF. In some aspects, a polymeric structure can have a pore volume (determined by nitrogen physisorption) of 0.5 $cm^3/g$ to 1.3 $cm^3/g$ and/or a pore volume (determined by mercury porosimetry) of 1.0 $cm^3/g$ to 3.0 $cm^3/g$.

Hollow Fiber Adsorbents and Adsorption Modules

Figure 12:
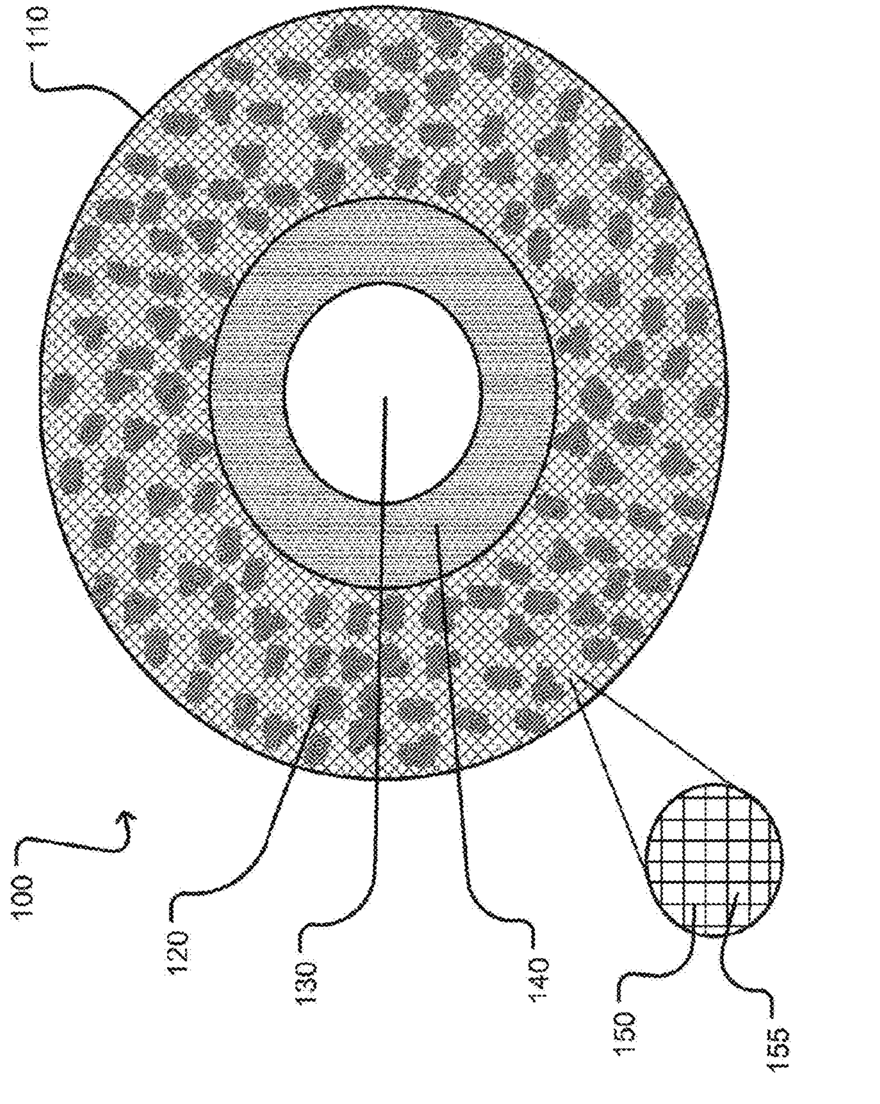
FIG. 12 shows an example of a hollow fiber structure including MOF materials in the polymeric structural material.

In various aspects, hollow fibers (and/or other types of fibers) incorporating MOF materials into the polymeric structural material can be formed. Such fibers can then be incorporated into an adsorption module. FIG. 12 shows an example of a hollow fiber sorbent incorporating MOF material in the polymeric structural material (which can also be referred to as a polymer matrix). In FIG. 12, a sorbent composition 100 includes a fiber 110, which itself comprises at least one MOF adsorbent material 120, a lumen 130 disposed within the fiber 110, and a barrier layer 140 lining the lumen 130 (i.e., at an interface between the lumen or bore and the polymeric structural material) to prevent fluid communication between the lumen 130 and the at least one MOF adsorbent material 120. The MOF adsorbent material 120 can be incorporated into the polymeric structural material 150 that forms the fiber 110. Optionally, the polymeric structural material 150 can include a plurality of tortuous pathways 155. A fiber 110 can correspond to many classes of materials that are continuous, flexible, filaments or are in discrete elongated pieces, similar to lengths of thread. As used herein, a "fiber" means a continuous, flexible, filamentous material having a relatively high aspect ratio (i.e., ratio of length to average longest cross-section). In an embodiment of the present invention, an aspect ratio can be at least 4:1, or at least 10:1, or at least 100:1, or at least 1000:1, such as up to 1,000,000:1 or possibly still larger.

A fiber 110 can have many cross-sectional shapes, including, but not limited to, a rectangular shape, a circular shape, a semicircular shape, a square shape, a pentagonal shape, a triangular shape, a hexagonal shape, an octagonal shape, a star-shape, a starburst shape, a "U" shape, a lobed shape, a multi-lobed shape, an arbitrary shape, or combinations thereof or therebetween. In some aspects, a fiber 110 can have an average longest cross-sectional dimension of at least 100 micrometers, or at least 500 micrometers, or at least 1000 micrometers, or at least 2000 micrometers, such as up to 50,000 micrometers or possibly still larger. In an aspect where a fiber has a circular cross-section, one example of a fiber can be a fiber with a diameter of 800 to 1500 micrometers.

In aspects where a fiber corresponds to a hollow fiber, a lumen 130 can also be present. A lumen 130 can have many cross-sectional shapes, including, but not limited to, a rectangular shape, a circular shape, a semicircular shape, a square shape, a pentagonal shape, a triangular shape, a hexagonal shape, an octagonal shape, a star-shape, a starburst shape, a "U" shape, a lobed shape, a multi-lobed shape, an arbitrary shape, or combinations thereof or therebetween. Depending on the aspect, a lumen can have substantially the same cross-sectional shape as the corresponding fiber, or the lumen can have a different cross-sectional shape. A lumen 130 can have an average longest cross-sectional dimension of at least 50 micrometers, or at least 200 micrometers, or at least 500 micrometers, or at least 1000 micrometers. In some aspects, the average longest cross-sectional dimension of the lumen can correspond to 1.0% to 50% of the average longest cross-sectional dimension of the corresponding fiber. In an embodiment of the present invention, a lumen 130 has an average longest cross-sectional dimension of about 300 micrometers. In an aspect where a lumen has a circular cross-section, one example of a lumen can be a lumen with a diameter of 200 to 500 micrometers.

One of ordinary skill in the art would realize that the cross-sectional shape of a fiber 110 and/or a lumen 130 will determine the average longest cross-sectional dimension of the fiber. For example, the average longest cross-sectional dimension of a fiber and/or lumen having a circular cross-sectional shape will be the diameter of the fiber and/or lumen. In an alternative example, the average longest cross-sectional dimension of a rectangular cross-sectional shape will be the diagonal between the length and width of the rectangular cross-section. In yet another example, the average longest cross-sectional dimension of a starburst cross-sectional shape will be the distance between the two furthest points of the starburst cross-section.

The barrier layer 140 can comprise many materials, including but not limited to polyvinylidene chloride (PVDC), polyacrylonitrile, epichlorohydrin (Hydrin), polyether amide block co-polymer, glass, silica, alumina, metal, metal oxides, latex, other high barrier polymers, co-polymers thereof, or combinations thereof. In other aspects, the barrier layer can be formed from a polymer suitable for forming a fiber composition, such as polyethersulfone or cellulose acetate. In such aspects, one option for the barrier layer dope solution is to use a solution that include the polymer plus a solvent, but without including metal organic framework sorbent material and/or pore-former. For example, the barrier layer dope solution can include 10 wt % to 50 wt % of polymer, with the balance corresponding to NMP or another convenient solvent and/or non-solvent. In some aspects, the barrier layer 140 can have an average thickness of 50 micrometers or less, or 30 micrometers or less, such as down to 5.0 micrometers or possibly still less.

In an embodiment of the present invention, a fiber can further comprise an end cap disposed at each longitudinal end of the fiber, wherein the end cap does not inhibit flow through the lumen. The end cap can prevent the fluid communication between the tortuous pathways of the longitudinal end of the fiber and the environment surrounding the longitudinal end of the fiber.

Figure 13A:
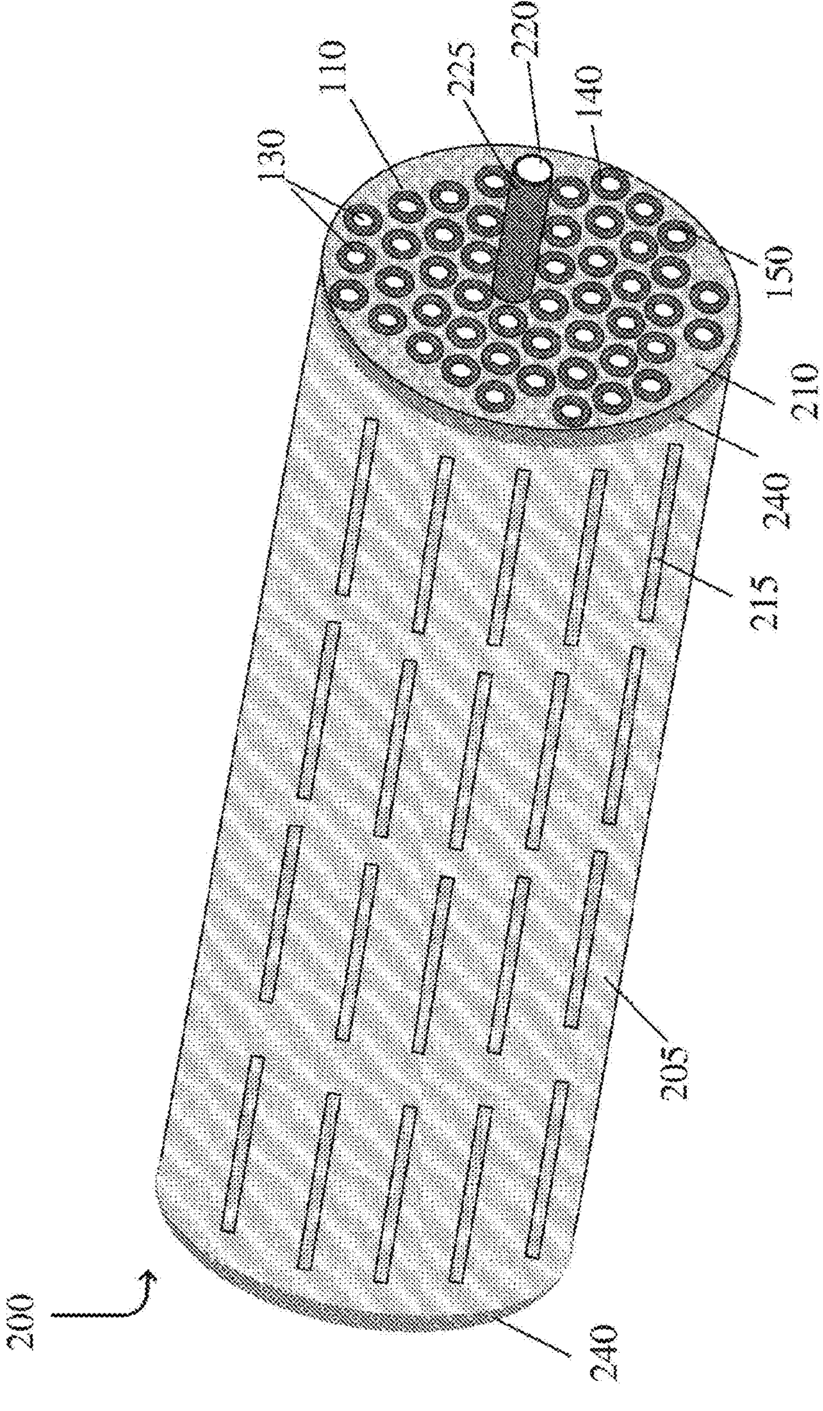
FIG. 13A shows an example of an adsorption contactor.
Figure 13B:
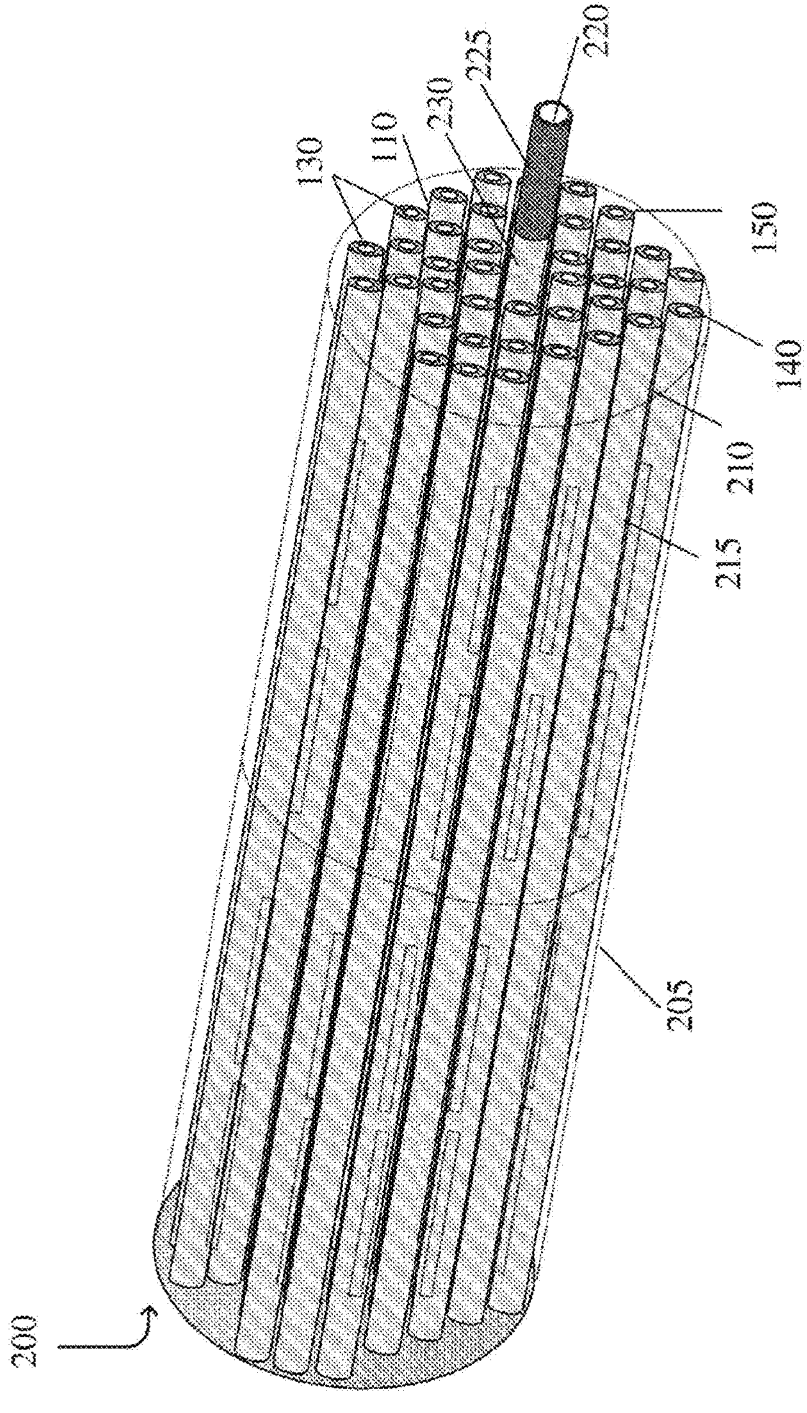
FIG. 13B shows an alternative view of the adsorption contactor shown in FIG. 13A.

FIG. 13A and FIG. 13B provide schematic representations of ways in which structured hollow fiber adsorbents can be formed into a contactor. A contactor 200 comprising structured hollow fibers adsorbents 110 is shown in FIG. 13A and FIG. 13B. FIG. 13B shows the contactor of FIG. 13A with the outer surfaces of the chamber of the contactor 205 rendered transparent. In FIG. 13B dotted lines indicate the edges of the outer surface of the contactor. A fiber 110 comprises a polymer matrix 150 comprising a polymer and at least one adsorbent material 120. The fiber 110 can include a lumen 130 disposed within the fiber 110 and a barrier layer 140 lining the lumen 130 to prevent fluid communication between the lumen and the adsorbent material. Since the barrier layer 140 prevents fluid communication between the lumen and the at least one MOF adsorbent material 120, a heat transfer medium can be passed through the lumen 130 of the fiber 110. To act as a diffusion barrier, the effective diffusion coefficient of the barrier layer 140 should be less than about $1/50$ the average diffusion coefficient in the polymer matrix 150 and preferably less than about $1/10{,}000$ the average diffusion coefficient in the polymer matrix 150. The diffusion barrier effectively precludes heating and cooling fluids fed through the lumen 130 from entering the polymer matrix 150 or the loss of sorbate material, such as $CO_2$, into the lumen fluids.

A plurality of substantially aligned fibers 110 can be arranged in a bundle or splayed. The ends of the fiber bundle can be potted or embedded in a binding material 210. The binding material 210 effectively interconnects adjacent fibers. For example, the binding material can fix the fibers 110 into a substantially parallel array. One method to do this is with an embedding or potting process that surrounds the ends of the fibers with a binding material 210. To visualize the potted fiber array, FIG. 13B shows the parallel channel fiber contactor with the binding material 210 rendered transparent along with chamber 205. This potted array is then sealed into a chamber 205. Sealing surfaces 240 are provided at the ends of the chamber 205. In operation, the chamber 205 can be mounted, for example, in a TSA (thermal swing adsorption) or RCTSA (rapid cycle thermal swing adsorption) module in a manner that prevents fluid communication between the medium for separation and a heat exchange medium. Although the chamber 205 is illustrated as a tubular or cylindrical chamber, the chamber can have many shapes including but not limited to a rectangular or cube shape.

In the example shown in FIG. 13A and FIG. 13B, slots 215 are cut through the wall of the chamber 205 to allow gas to pass into the contactor. A central gas collection tube 220 is located in the center of the contactor. The end 225 of the central gas collection tube 220 is a solid impermeable material, which can include, but is not limited to, a solid metal or engineering plastic. This allows gas to enter or exit the contactor 200 without mixing with the heating or cooling fluids. The portion of the gas collection tube inside the module 230 is a porous material, such as porous metal or a porous polymer or a woven mesh, among others. This allows gas within the contactor to be efficiently collected. In the adsorption step, a process gas (such as a $CO_2$-containing flue gas) flows into the contactor 200 through the slots 215 and contacts the hollow fiber adsorbents 110. The polymer matrix 150 comprising at least one MOF adsorbent material 120 removes one or more components from the process gas, such as $CO_2$. A purified stream is collected in the highly porous section 230 of the central gas collection tube 220. Purified gas passes out of the contactor 200 through the impermeable section 225 of the central gas collection tube 220 that connects to flow control valves (not shown) and an exhaust stack (not shown). To limit the temperature rise during the adsorption step, a cooling medium (e.g., water) is passed through the lumen 130 of the structured hollow fiber 110. After the adsorption step has been completed, the flow of process gas into the module is shut off with a valve, and a heating medium (e.g., steam) is passed through the lumen 130 of structured hollow fiber 110. The adsorbed component (such as $CO_2$) can then be desorbed and can pass out of the contactor 200 either through the central gas collection tube 220 or through the slots 215.

In various embodiments of the present invention, the contactor 200 can be designed to provide efficient contacting of the medium (e.g., flue gas mixture) with the at least one adsorbent material that selectively removes at least one component from the medium. Efficient contacting can reduce or minimize the amount of adsorbent required, volume of the contactor, and energy required to regenerate the contactor. With an efficiently designed contactor, the pressure drop of flue gas, and fluids used to heat or cool the contactor is also reduced or minimized. This, in turn, minimizes energy lost from pressure drop of flue gas flowing through the contactor and the energy required to pump or compress the fluids used to heat or cool the contactor.

As an example of adding a barrier layer, a lumen barrier can be installed in a hollow fiber by a pervaporation process in a post-spinning step. Following packing of hollow spun fibers into adsorbent modules, polyvinylidine dichloride (PVDC) can be passed through the bore with an $N_2$ carrier gas, while a vacuum is applied to the shell-side of the fibers contained within the fiber module. This can promote lumen layer formation via hydraulic suction and pervaporation of water from the PVDC suspension.

It has been unexpectedly discovered that an improved lumen layer can be formed by using a sweep gas containing a reduced or minimized water content, such as having substantially no water content. This is in contrast to the conventional understanding, such as the description in U.S. Pat. No. 8,257,474, where it is conventionally believed that using a sweep gas that includes water vapor is needed in order to facilitate some partial dissolution and re-deposition of the PVDC lumen layer in order to prevent defect formation and/or pinholes. Instead, in various aspects, it has been discovered that using a sweep gas containing 0.5 vol % or less of water, or 0.1 vol % or less of water, such as down to having substantially no water content (i.e., less than 0.01 vol %), can reduce permeance across a lumen layer by a factor of 10 or more, or 20 or more, or possibly still higher.

In some aspects, during flowing of the polymer and/or the carrier gas to form the barrier layer, a reduced pressure can be applied to the outside of the hollow fiber. By reducing the pressure within the polymeric structural material during barrier layer formation, the polymer material can be partially drawn into the pores of the polymeric structural material, thereby forming an improved barrier. In various aspects, the pressure in the polymeric structural material during barrier layer formation can be lower than a pressure within the bore by 10 kPa-a or more, or 20 kPa-a or more, or 40 kPa-a or more, such as up to 200 kPa-a or possibly still higher.

Configuration Examples—Fabrication of Hollow Fibers

FIG. 1 shows an example of a process for forming hollow fibers. In FIG. 1, a dope solution 15 can include MOF material, polymer, solvent, and a non-solvent. In some alternative aspects, the dope solution can include MOF material, polymer, solvent, and a pore forming component such as lithium nitrate. In still other alternative aspects, the dope solution can include MOF material, polymer, and solvent. The dope solution 15 and a bore fluid 11 can be passed into a spinneret 20 to form a sorbent hollow fiber. After passing the fiber through a water quench bath 30, the hollow fiber can be wound on to take-up drum 40. After forming the hollow fiber, a barrier layer can be added to the hollow fiber to form a hollow fiber 50 that includes a barrier layer between the polymeric structural material and the central bore or lumen. A plurality of the hollow fibers can then be incorporated into an adsorption contactor 60. It is noted that a similar configuration, but without use of a bore fluid, can be used to form fibers that do not include a lumen. In some optional aspects, a three-channel spinneret can be used so that a barrier layer dope solution (not shown) can be co-extruded during extrusion of a hollow fiber structure.

In an alternative configuration, rather than coiling the hollow fiber onto a take-up drum, in some aspects the hollow fiber can be collected in the water quench bath 30. In this type of aspect, a slow rotation can be introduced into the water to reduce or minimize tangling of the hollow fiber as it collects in the water bath. For some types of dope solutions, such as dope solutions including PIM-1, this alternative configuration can facilitate and/or improve hollow fiber formation.

Conventionally, one limitation on the types of dope solutions and/or types of polymers that can be used to form hollow fibers is the tendency for some polymers to form brittle hollow fiber structures that can break when pulled onto a take-up drum during production. To avoid tension on the hollow fiber during production, a stirred water bath can be used instead of a take-up drum. This can allow long fibers to be produced while reducing or minimizing tension from mechanical pulling of the fiber during production. To avoid forming a randomly entangled fiber, the water bath for collecting the fiber can be gently stirred during hollow fiber formation, so that the fiber forms a coil.

Appending Amines after Fiber Formation

One of the benefits of MOF materials is that some MOF materials can be modified to include appended functional groups, such as appended amines. As an example, EMM-67 is a type of MOF-274 that includes Mg and Mn as metals. EMM-67 can be converted into EMM-44 by appending amine functional groups (in the form of 2-aminomethylpiperidine) to the EMM-67. The ability to append functional groups can provide a variety of advantages.

As an example, amine-appending can be used to modify the nature of the $CO_2$ adsorption isotherm and/or isobar associated with a MOF material, so that the resulting amine-appended material has a Type V isotherm/isobar instead of a Type I isotherm/isobar. Typical MOF materials can have a Type I (or "Langmuir-type") isotherm/isobar for $CO_2$ adsorption. In a Type I isotherm, the adsorption rises quickly and then plateaus. For adsorbents with this type of isotherm, it is difficult to utilize substantial portions of the potential working capacity of the adsorbent when attempting to perform commercial scale adsorption and desorption. Appending amines to a MOF structure can convert the $CO_2$ adsorption for the amine-appended MOF to a Type V isotherm and/or isobar. Type V isotherm/isobar behavior is much more favorable when attempting to perform cyclic adsorption and desorption from an adsorbent material. In particular, a Type V isotherm/isobar can provide minimal uptake at lower pressure/higher temperature, and then a significant uptake at higher pressure/lower temperature.

It is noted that a material having an isotherm/isobar corresponding to a Type V isotherm/isobar can have one or more "steps" of Type V behavior. In this discussion, unless otherwise specified, description of a material as a Type V isotherm/isobar is defined to mean that the isotherm/isobar for the material exhibits at least one "step" of Type V behavior. For example, in this discussion, EMM-44 is referred to as a material having a Type V isotherm/isobar. EMM-44 is an example of a material where the isotherm/isobar for the material exhibits two separate steps of Type V behavior.

Unfortunately, it has been discovered that the materials and/or conditions used for hollow fiber formation can result in at least partial stripping of appended amines, such as up to substantially complete stripping of appended amines from MOFs included in a dope solution. Thus, if the MOF EMM-44 is included in a dope solution for hollow fiber formation, during formation of the dope solution and/or during spinning of the hollow fiber, the amines can be stripped from the MOF so that the MOF present in the resulting hollow fiber at least partially corresponds to and/or substantially corresponds to EMM-67 rather than EMM-44.

It has further been discovered that hollow fibers incorporating MOF materials with appended amines can be formed by appending the amines after formation of the hollow fiber. This can avoid stripping of the amines during hollow fiber formation, as the amines are not appended to the MOF materials until after the hollow fiber formation process is completed.

Appending amines to MOFs in a hollow fiber structure can be performed, for example, by soaking the structure in an appropriate solution to add amines to MOFs with available sites for appending of an amine After forming a hollow fiber structure that incorporates a MOF as an adsorbent, the amine can be appended by contacting the entire system in an amine-containing solution. An example of a solution is 10 vol %-40 vol % of 2-aminomethylpiperidine in a solvent such as toluene or methanol. Other examples of amines that can be appended in this manner include, but are not limited to, N,N'-dimethylethylenediamine, 2,2-dimethyl-1,3-propanediamine, and triethylenetetraamine. The solvent used for amine appending can be a polar aprotic solvent (e.g., toluene, hexanes), but surprisingly methanol can also be used, in spite of the fact that methanol has a tendency to strip diamines from MOFs when methanol is part of a dope solution. It is noted that if higher concentrations of amine are included in the solution for appending, the amines may start to append to sites on the polymer rather than appending to the metals in the MOF. The volume of solution for soaking the hollow fiber structure can be selected based on the amount of MOF present in the hollow fiber structure. For example, a sufficient volume of solution can be used so that the quantity of amine (or mixture of amines) in the solution volume is between 1.0 and 10 times the stoichiometric amount of needed for appending the amine(s) to all of the MOF metal sites in the hollow fiber.

Example 1—Examples of Formation of Hollow Fiber Sorbents Incorporating MOFs

Various hollow fiber sorbents including MOF materials in the polymeric structural material were produced. The hollow fibers were formed using a configuration similar to FIG. 1, but a stirred water bath was used to collect the fibers rather than using a take-up drum. Ternary phase diagrams were constructed to allow for selection of the dope formulations. The cloud-point technique was used to determine the binodal line between the single phase and two phase regions in the phase diagram.

A variety of hollow fibers with varying levels of MOF adsorbent content were produced. Table 2 shows examples of the types of dope solutions that were used to produce hollow fiber sorbents at high concentrations. For the dope solutions including MOF in Table 2, the MOF incorporated into the dope solution was EMM-44, which is an amine-appended version of EMM-67, a MOF based on a multi-ring disalicylate linker. However, it was subsequently discovered that the solvents and/or conditions used for hollow fiber formation can result in substantial removal of appended diamines from MOF materials. As a result, the MOF present in the resulting hollow fibers formed according to the conditions in Table 2 is believed to substantially correspond to EMM-67. Although the hollow fibers formed from the dope solutions in Table 2 may have incorporated substantial amounts of EMM-67 instead of EMM-44, the weight percentages in Table 2 are reported based on EMM-44, since that was the MOF that was initially introduced into the dope solution. Both EMM-44 and EMM-67 are variations on MOF-274.

TABLE 2

Dope Formulations with High Loadings of MOFs

| Solvent | Nonsolvent | Polymer | Pore former | Adsorbent |
|---|---|---|---|---|
| NMP (81 wt %) | $H_2O$ (1 wt %) | AO-PIM-1 (18 wt %) | | — |
| NMP (60.7 wt %) | $H_2O$ (0.7 wt %) | AO-PIM-1 (13.5 wt %) | | EMM-44 (25.1 wt %) |
| NMP (70.8 wt %) | $H_2O$ (7.8 wt %) | Torlon ® (14.9 wt %) | | EMM-44 (6.5 wt %) |
| NMP (66.3 wt %) | | CA (18.4 wt %) | $LiNO_3$ (7.4 wt %) | EMM-44 (7.9 wt %) |
| NMP (64.5 wt %) | $H_2O$ (9.2 wt %) | CA (18.4 wt %) | | EMM-44 (7.9 wt %) |
| NMP (55.7 wt %) | EtOH (20.4 wt %) | PES (16.7 wt %) | | EMM-44 (7.2 wt %) |

For AO-PIM-1, the dope formulation shown in row 2 of Table 2 resulted in hollow fibers with a MOF concentration of close to 65 wt %. Other formulations for AO-PIM-1 resulted in hollow fibers with MOF concentrations between 9 wt % and 75 wt %. For cellulose acetate and Torlon®, dope formulations are shown that resulted in hollow fibers with MOF concentrations between 20 wt % to 25 wt %. For cellulose acetate, 25 wt % MOF was close to the maximum that could be included while still being able to form hollow fibers via spinning, but additional lower concentrations were also made. However, some of the difficulty with forming hollow fibers with higher MOF concentrations may have been due to interactions of the polymer materials in the dope solution with the amines stripped from the original EMM-44 that was incorporated. Table 2 also shows formation of a hollow fiber including PES and roughly 25 wt % MOF. Other PES dopes were also made that allow for formation of hollow fibers with MOF contents of up to roughly 75 wt %.

It is noted that for one of the cellulose acetate fibers in Table 2, instead of including water as a non-solvent, lithium nitrate was added to the dope solution as a pore former. Table 3 shows the spinning conditions that were used to make hollow fibers from the dope solutions shown in Table 2.

TABLE 3

Hollow Fiber Spinning Conditions

| | AO-PIM-1-1/MOF | MOF/Cellulose Acetate | MOF/Torlon |
|---|---|---|---|
| Air Gap (cm) | 1 | 1 | 1 |
| Take-up Rate (m/min) | 6 | 15 | |
| Quench bath temp (° C.) | 25 | 50 | 50 |
| Operation temp (° C.) | 25 | 50 | 50 |
| Bore Fluid | NMP/$H_2O$ (81/19 wt %) | NMP/$H_2O$ (80/20 wt %) | NMP/$H_2O$ (80/20 wt %) |
| Core extrusion rate (ml/hr) | 200 | 400 | 500 |

TABLE 3-continued

Hollow Fiber Spinning Conditions

| | AO-PIM-1-1/MOF | MOF/Cellulose Acetate | MOF/Torlon |
|---|---|---|---|
| Bore Extrusion rate (mL/hr) | 50 | 100 | 250 |
| Solvent Extrusion rate (mL/hr) | | NMP, 5 | |

In addition to spun hollow fibers, additional fibers were also made using a syringe to extrude a dope solution. Syringe extrusion can be used to rapidly verify suitability for hollow fiber spinning.

Example 2—Characterization of MOF-Containing Hollow Fibers (9 wt % MOF)

A series of hollow fibers were formed according to the general methods described in Example 1, but with MOF contents of between 5.0 wt % to 10 wt %. These low MOF content hollow fibers were characterized in various manners. As an initial characterization, powder x-ray diffraction (XRD) and scanning electron microscopy (SEM) were used to verify the presence of the MOF crystals within the polymeric structural material of the hollow fibers.

Figure 4:
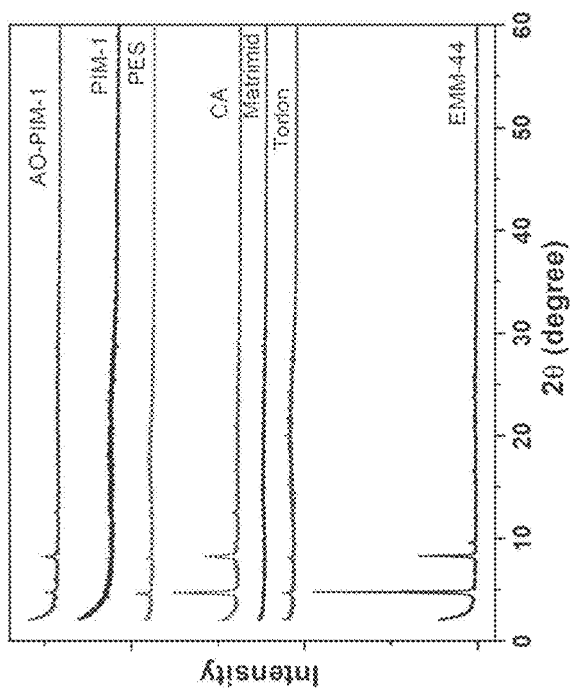
FIG. 4 shows powder X-ray diffraction spectra from samples of hollow fiber structures that included EMM-44 in the dope solution for forming the polymeric structural material, along with a reference spectrum for neat EMM-44.

FIG. 4 shows powder XRD characterization of hollow fibers that were formed from a dope solution that included EMM-44. As shown in FIG. 4, the XRD signature of EMM-44 (bottom spectrum in FIG. 4) was visible in the hollow fibers formed using AO-PIM-1, cellulose acetate (CA), and polyethersulfone (PES).

Figure 5:
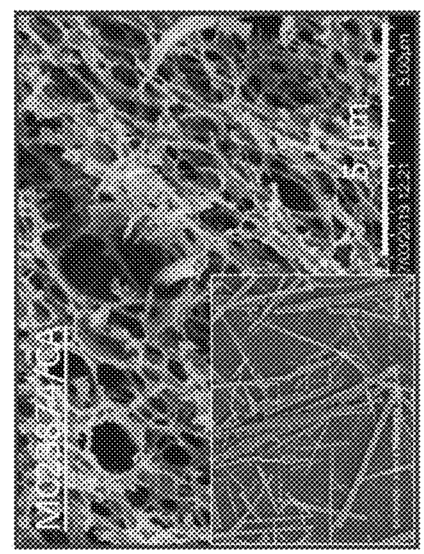
FIG. 5 shows SEM micrographs of hollow fiber structures that include MOFs in the polymeric structural material.
Figure 5:
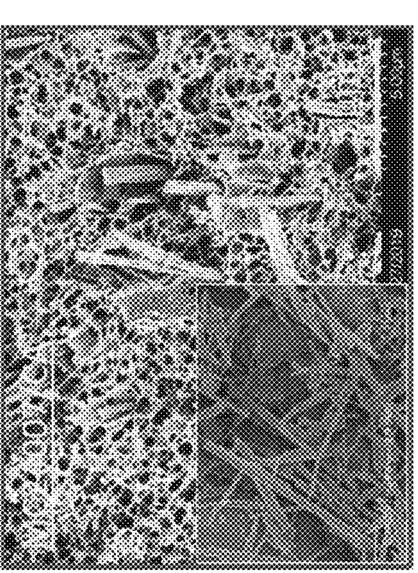

FIG. 5 shows SEM micrographs of samples of hollow fibers made using cellulose acetate, and incorporating either EMM-67 (left micrograph) or EMM-44 (right micrograph). As shown in FIG. 5, the fiber-like crystals of EMM-67 or EMM-44 can be seen in the porous polymer structure. Such fibers were similarly observed in SEM micrographs of hollow fibers made using polyethersulfone.

Yet another type of characterization was to measure $CO_2$ diffusion within the hollow fibers containing roughly 5.0 wt % to 10 wt % MOF. Table 4 shows the $CO_2$ diffusion coefficients for hollow fibers formed from cellulose acetate, Matrimid® 5218, the Torlon® polymer, and the polyethersulfone. As shown in Table 4, $CO_2$ diffusion remained relatively fast within the polymeric structural materials after inclusion of the MOF material.

TABLE 4

$CO_2$ Diffusion Coefficients

| Samples | $CO_2$ diffusion coefficient ($cm^2/s$) |
|---|---|
| MOF/CA | $3.93 \times 10^{-6}$ |
| MOF/Matrimid | $8.28 \times 10^{-6}$ |
| MOF/PES | $7.02 \times 10^{-6}$ |
| MOF/Torlon | $3.41 \times 10^{-6}$ |

Example 3—Higher MOF Content Hollow Fibers

It has been discovered that some polymers can allow for incorporation of unexpectedly high contents of MOF materials. Examples of polymers that can be used for incorporation of high amounts of MOF materials include polyethersulfone and AO-PIM-1. The amount of MOF that can be incorporated into the AO-PIM-1 is unexpectedly high, corresponding to up to 80 wt % of a hollow fiber, while still allowing for formation of hollow fibers by a hollow fiber spinning process.

For AO-PIM-1, a series of dope solutions were formed according to the general method of Example 1. The dope solutions included EMM-44 contents that corresponded to production of hollow fibers with MOF contents (as EMM-67) ranging from roughly 7.0 wt % to roughly 60 wt %. In spite of the presence of the stripped amines, it was unexpectedly found that hollow fibers could be successfully formed from all of the solutions.

This is in contrast to the results from a second series of dope solutions involving EMM-44 and cellulose acetate. It is believed that amines stripped from the EMM-44 interfered with the flow properties of the dope solutions, so that spun hollow fibers could only be formed with MOF contents (as EMM-67) of only up to roughly 25 wt %. It is believed that higher MOF contents could be achieved if EMM-67 were used in the initial dope solution rather than EMM-44, so that the stripped amines would not be present in the dope solution. It was possible using syringe extrusion to form fibers with still higher contents of EMM-67.

For Torlon® and Matrimid®, the presence of the stripped amines resulted in still further reduction in the ability to form hollow fibers at concentrations greater than roughly 10 wt % MOF (for Matrimid®) or roughly 20 wt % (for Torlon®).

Example 4—High MOF Content Hollow Fibers and Amine Appending

In order to avoid the difficulties caused by the presence of stripped amines in a dope solution, another series of dope solutions were formed using EMM-67 as the MOF and polyethersulfone as the polymer. Hollow fibers were formed with MOF (EMM-67) contents of up to 75 wt %.

Hollow fibers with an EMM-67 content of roughly 75 wt % were then exposed to various amounts of a solution of 25 wt % 2-aminomethylpiperidine (2-ampd) in methanol in order to convert the EMM-67 into EMM-44 by appending of amines. For different fibers, volumes of solution corresponding to 0.5 to 5.0 times the stoichiometric amount of amine for appending amine to all MOF metal sites were used.

Figure 6:
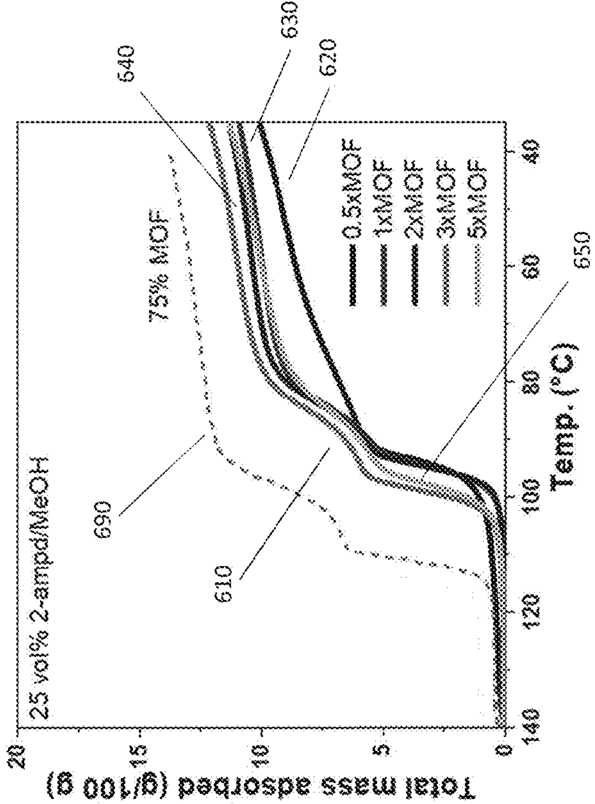
FIG. 6 shows $CO_2$ uptake values for hollow fiber structures formed from polyethersulfone and EMM-67 after exposure to varying amounts of an amine-appending solution containing 2-aminomethylpiperidine for conversion to EMM-44.

$CO_2$ uptake was then measured for the various fibers. FIG. 6 shows the $CO_2$ uptake results. It is noted that without incorporated MOF, hollow fibers of polyethersulfone have little or no $CO_2$ uptake capacity, so substantially all of the $CO_2$ uptake in FIG. 6 corresponds to $CO_2$ uptake by incorporated MOF materials. As shown in FIG. 6, it was found that a volume of solution corresponding to roughly 3.0 times the stoichiometric amount (curve 610) provided the highest $CO_2$ uptake. In FIG. 6, an idealized uptake curve (curve 690) is also shown, based on expected calculated uptake for the amount of MOF if all of the MOF corresponds to EMM-44 instead of EMM-67. As shown in FIG. 6, the post-amine appending procedure was able to convert a substantial portion of the MOF to EMM-44. Even at a solution volume corresponding to only 0.5 times the stoichiometric amount of amine required for the MOF metal sites (curve 620), the resulting hollow fiber provided substantial $CO_2$ uptake, although qualitatively the shape of the uptake curve is changed relative to the higher solution volumes. The remaining concentrations investigated of 1.0 times (curve 630), 2.0 times (curve 640), and 5.0 times (curve 650) the stoichiometric amount results in $CO_2$ uptake values similar to but lower than curve 610 for the concentration of 3.0 times the stoichiometric amount.

Figure 7:
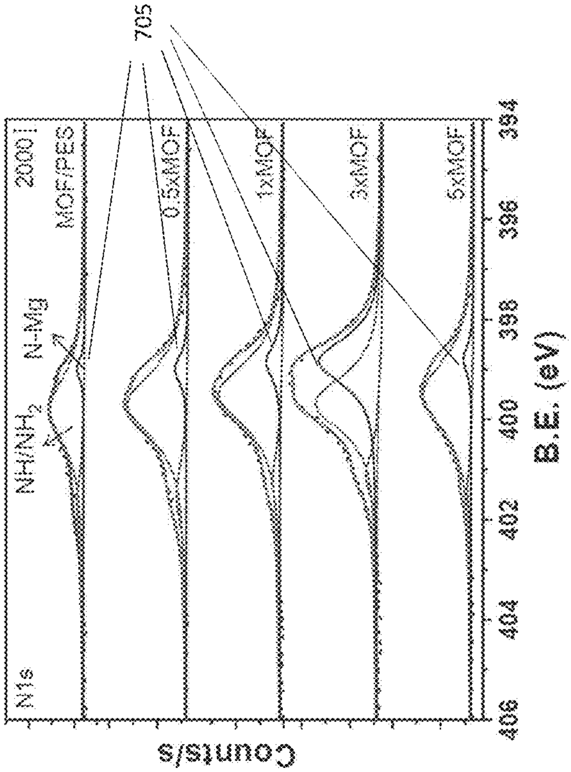
FIG. 7 shows XPS spectra of hollow fiber structures formed from polyethersulfone and EMM-67 after exposure to varying amounts of an amine-appending solution.

X-ray photoelectron spectroscopy (XPS) was also used to characterize the various hollow fibers containing 75 wt % MOF after the amine-appending procedures. FIG. 7 shows XPS results for the region of the XPS spectra roughly corresponding to the is shell of nitrogen atoms. The N—Mg peak 705 in each spectra represents the amount of amine that has been appended to a metal site. As shown in FIG. 7, the hollow fibers treated with roughly 3.0 times the stoichiometric amount of amine resulted in the largest N—Mg peak in the XPS spectra. Based on other XPS data, the hollow fiber treated with roughly 3.0 times the stoichiometric amount of amine had an N—Mg peak corresponding to roughly 43 atomic % of the nitrogen in the sample, which is close to the theoretical maximum of 50 atomic % that would be expected if every Mg site in the sample had an appended nitrogen atom.

Example 5—Barrier Layer Formation

It has been unexpectedly discovered that use of a dry carrier gas or sweep gas during barrier layer formation can reduce or minimize transport of fluids across the resulting barrier layer. To illustrate formation of barrier layers in the bore or lumen of the hollow fibers, polyvinylidene dichloride was used to form barrier layers in hollow fibers formed from PIM-1 and cellulose acetate. The lumen barriers were installed in the hollow fiber by a pervaporation process in a post-spinning step. Following packing of hollow spun fibers into adsorbent modules, polyvinylidine dichloride (PVDC) was passed through the bore with an $N_2$ carrier gas. In some runs, a vacuum was also applied to the shell-side of the fibers contained within the fiber module, promoting lumen layer formation via hydraulic suction and pervaporation of water from the PVDC suspension. Table 5 displays the permeability of the hollow spun PIM-1 fibers with and without installation of the PVDC barrier layer. In all instances, introduction of the PVDC layer resulted in substantial decrease of permeance, displayed in generic permeance units (GPU). “Wet” vs “Dry” refers to whether the $N_2$ carrier gas was humidified. The “Wet” $N_2$ carrier gas included roughly 30 wt % relative humidity. The “Dry” $N_2$ carrier gas included 0.5 vol % or less of $H_2O$.

TABLE 5

| Permeance from Lumen to Polymeric Structural Material - PIM-1 Fiber | | | | | |
|---|---|---|---|---|---|
| | P/L (GPU) | | | | |
| Gas | w/o lumen layer | “Dry” | Vacuum “Dry” | “Wet” | Vacuum “Wet” |
| $N_2$ | 4537 | 94 | 14 | 3425 | 177 |
| $CH_4$ | 6070 | 83 | 10 | 4546 | 222 |
| $CO_2$ | 7507 | 851 | 28 | 3785 | 565 |
| $H_2O$ | | | 53 | | 691 |

Conventionally, it is believed that it is necessary to use a humidified carrier or sweep gas during barrier layer formation. It is believed that the water in the sweep gas can allow additional solvation of the polymer as the barrier layer is forming, so that polymer can be re-deposited to reduce or minimize defects in the layer. In contrast to this conventional understanding, as shown in Table 5, it has been unexpectedly discovered that using a dry carrier gas resulted in a reduction in permeance across the layer of between 5.0 times to 10 times relative to a similarly formed sample with a wet carrier gas. This indicates that contrary to conventional understanding, an improved barrier layer can be formed by avoiding the presence of water in a sweep gas or carrier gas. In some aspects, a barrier layer can be formed with a permeance for $N_2$ of 100 GPU or less.

Similar results were also observed for barrier layers introduced into cellulose acetate fibers. Table 6 shows the permeance values for barrier layers installed into cellulose acetate (CA) fibers by a similar method. It is noted that the results shown in Table 6 are for CA fibers that included between 5.0 wt % to 10 wt % of EMM-67.

TABLE 6

| Permeance from Lumen to Polymeric Structural Material - CA Fiber | | | | |
|---|---|---|---|---|
| | P/L (GPU) | | | |
| Gas | w/o lumen layer | “Wet” | “Dry” | Vacuum “Dry” |
| He | * | 5320 | 865 | 5.4 |
| $N_2$ | 80787 | 2048 | 583 | 4.4 |
| $CH_4$ | 86604 | 5274 | 859 | 5.3 |
| $CO_2$ | 56711 | 2669 | 473 | 3.9 |

As shown in Table 6, similar reductions in barrier layer permeance were achieved by using a dry carrier gas rather than a wet carrier gas. This illustrates that improved barrier layers can generally be formed in hollow fibers using a dry carrier gas or sweep gas, independent of the type of polymeric structural material used to form the hollow fiber.

Example 6—Modification of External Permeance of Hollow Fibers

For some types of polymers, the spinning process for producing a hollow fiber can result in formation of a “skin” layer on the exterior surface of the fiber. This skin layer can reduce the permeance of the outer surface of the hollow fiber, thus potentially reducing or minimizing the rate at which process gas can access adsorption sites within the fiber. It has been discovered that the formation of this exterior “skin” layer can be mitigated by forming the hollow fiber in the presence of a vapor phase of the solvent. The vapor of solvent can form a “sheath” around the fiber during formation, resulting in improved permeance at the outer surface.

A series of PIM-1 hollow fiber samples were formed using the dope solution described in Table 2 above. Table 7 shows various spinning conditions that were used, including a vapor flow rate for the solvent (in this case, tetrahydrofuran or THF) in the environment surrounding the fiber during formation by spinning. For comparison, Table 7 also includes samples where no THF vapor was present (sample 1) or where a vapor phase was not present but the fiber was dipped in THF after formation (sample 2).

TABLE 7

| Permeance Variations based on Spinning Environment | | | | | | | |
|---|---|---|---|---|---|---|---|
| | Spinning conditions | | | | | | |
| Sample | Dope FR | Bore FR | THF FR | P/L (GPU) | | | |
| No. | (mL/hr) | (mL/hr) | (mL/hr) | $N_2$ | He | $CH_4$ | $CO_2$ |
| 1 | 100 | 100 | / | 4537 | 10606 | 6070 | 7507 |
| 2 | 100 | 100 | Dipping | 5570 | 14864 | 7485 | 8859 |
| 3 | 100 | 100 | 5 | 7292 | 18429 | 11113 | 15705 |
| 4 | 100 | 100 | 10 | 5749 | 14931 | 8000 | 12545 |
| 5 | 1000 | 100 | 5 | 5227 | 9357 | 5950 | 5744 |
| 6 | 50 | 50 | 5 | 13816 | 34455 | 22941 | 24226 |

As shown in Table 7, including some type of solvent vapor phase provided improved permeance for the resulting fibers. Additional benefits could be achieved by reducing the flow rate of the dope solution (i.e., slower fiber production) in the presence of the solvent vapor phase.

Example 7—Pore Forming Components

Formation of macrovoids is deleterious to the performance of polymer-based adsorbent contactors, including those supporting metal-organic frameworks (MOFs), such as EMM-44, EMM-67, or MOF-274 type frameworks. Addition of a pore former to a dope solution is one option for reducing or minimizing macrovoid formation, thereby potentially improving adsorption kinetics and gas permeance.

A series of hollow fiber structures were formed using dope solutions containing EMM-44 and cellulose acetate. As explained above, this resulted in hollow fiber structures containing EMM-67. For comparison, all hollow fiber contactors were unified to contain 20 wt % to 25 wt % EMM-44 to achieve a good mechanical property and homogeneous dispersion of MOF particles in the dope. Detailed dope compositions and spinning conditions are listed in Table 8.

TABLE 8

| Dope Solutions Based on Cellulose Acetate and EMM-44 | | | | |
|---|---|---|---|---|
| Spinning Attempt No. | | Spin 1 | Spin 2 | Spin 3 |
| Dope solutions (g) | | | | |
| CA | | 11.67 | 12 | 12 |
| NMP | | 40.85 | 42 | 42 |
| $H_2O$ | | 5.84 | 6 | 6 |
| $LiNO_3$ | | | 2 | 2 |
| EMM-44 | | 5 | 5 | 5 |
| Spinning parameters | | | | |
| Air gap (cm) | | 1 | 1 | 1 |
| Take-up rate (m/min) | | 15 | | |
| Quench bath temp. (C.) | | 50 | | |
| Bore fluid (wt. %) | | NMP/$H_2O$, 80/20 | NMP/$H_2O$, 80/20 | NMP/$H_2O$, 80/20 |
| Extrusion rate (mL/hr) | Bore | 400 | 400 | 400 |
| | Core | 100 | 100 | 100 |
| | Solvent sheath | | | 5 |

Permeance values for various types of gases were determined for the hollow fiber structures formed from the dope solutions in Table 8. The permeance testing results are shown in Table 9. As shown in Table 9, the EMM-44/CA hollow fiber without additional pore former achieves high pure gas permeances up to 77889 GPU for He, while after adding $LiNO_3$ into the dope, pure gas permeances drop dramatically to 24553 GPU. The drop in permeance was smaller for other potential process gases, such as $CO_2$, but still significant.

TABLE 9

| Permeance Values after Pore Former Addition | | | | | |
|---|---|---|---|---|---|
| Fiber | Dope and spinning | P/L (GPU) | | | |
| No. | conditions | $N_2$ | He | $CH_4$ | $CO_2$ |
| A | CA | 15649 | 77889 | 23847 | 15874 |
| B | CA/$LiNO_3$ | 10492 | 24553 | 14463 | 9044 |
| C | CA/$LiNO_3$ + NMP sheath | 80787 | /* | 86604 | 56711 |

Figures 8, 9:
FIG. 8 shows SEM micrographs of the outer surfaces of various hollow fibers formed from cellulose acetate.
FIG. 9 shows SEM micrographs of the outer surfaces of various hollow fibers formed from AO-PIM-1.

Without being bound by any particular theory, it is believed that the loss in permeance with addition of the $LiNO_3$ pore former was due to formation of a skin layer on the hollow fiber. FIG. 8 shows SEM images of the surface of the hollow fibers shown in Table 9. The left image in FIG. 8 corresponds to Fiber a in Table 9, while the middle image corresponds to Fiber b and the right image corresponds to Fiber c. As shown in FIG. 8, the middle image (formed with $LiNO_3$) includes a skin layer on the surface of the fiber that is not present in the left image (no $LiNO_3$). The middle image also shows a reduction in macrovoids, as desired when adding a pore former. It has been discovered that the benefit of reduced macrovoids can be achieved while reducing, minimizing, or avoiding the presence of a skin layer by using the solvent-sheath spinning method illustrated in Example 6. The right image in FIG. 8 shows the surface of a fiber made using a solvent sheath of NMP according to the method from Example 6. As shown in the right image, the resulting fiber was skin-free and had a substantially uniform structure. The removal of the skin layer is also shown in Table 9. With the NMP-sheath during spinning (Fiber c), pure gas permeances improved substantially. For example, $CO_2$ permeance increases from 15874 to 56711 GPU. He permeance cannot be detected through a bubble flow meter due to its extremely high flow rate. It is noted that a lumen barrier layer was subsequently installed in Fiber c.

To further illustrate the benefits of $LiNO_3$ as a pore former when incorporating MOF materials into a polymeric structural material, additional hollow fiber structures were formed using dope solutions containing EMM-44 and AO-PIM-1. Table 10 shows the dope compositions and quench bath temperatures for tuning the pore structures. For comparison, tests were also performed with PVP as a pore former.

TABLE 10

| Dope Formulations for EMM-44 and AO-PIM-1 | | | | | | | |
|---|---|---|---|---|---|---|---|
| Sample No. | AO-PIM-1 (wt. %) | NMP (wt. %) | $H_2O$ (wt. %) | EMM-44 (wt. %) | PVP (wt. %) | $LiNO_3$ (wt. %) | Quench bath temp. (° C.) |
| 1 | 11.7 | 52.6 | 0.6 | 35.1 | | | 25 |
| 2 | 11.7 | 50.6 | 2.6 | 35.1 | | | 25 |
| 3 | 7.7 | 67.7 | 1.5 | 23.1 | | | 25 |
| 4 | 7.7 | 65.4 | 3.8 | 23.1 | | | 25 |
| 5 | 7.7 | 65.4 | 3.8 | 23.1 | | | 50 |
| 6 | 7.7 | 65.4 | | 23.1 | | 3.8 | 50 |
| 7 | 6.9 | 65.4 | 3.8 | 23.1 | 0.8 | | 50 |
| 8 | 6.9 | 65.4 | | 23.1 | 0.8 | 3.8 | 50 |

FIG. 9 shows SEM images of the surface of Fiber 1 (left image), Fiber 5 (middle image), and Fiber 6 (right image) from Table 10. As shown in FIG. 9, the pore structure of the sample with $LiNO_3$ quenching at 50° C. appears more porous and open. This demonstrates that $LiNO_3$ can more generally be used as a pore former for formation of polymeric structural materials that incorporate MOF materials.

Example 8—Alternative Hollow Fiber Structure—Infusion of PEI into PIM-1

An alternative strategy for improving the adsorption capacity of a sorbent hollow fiber can be to infuse an adsorbent polymer into the hollow fiber structure. As an example, polyethyleneimine (PEI) can be infused into a hollow fiber composed of PIM-1.

Figure 10:
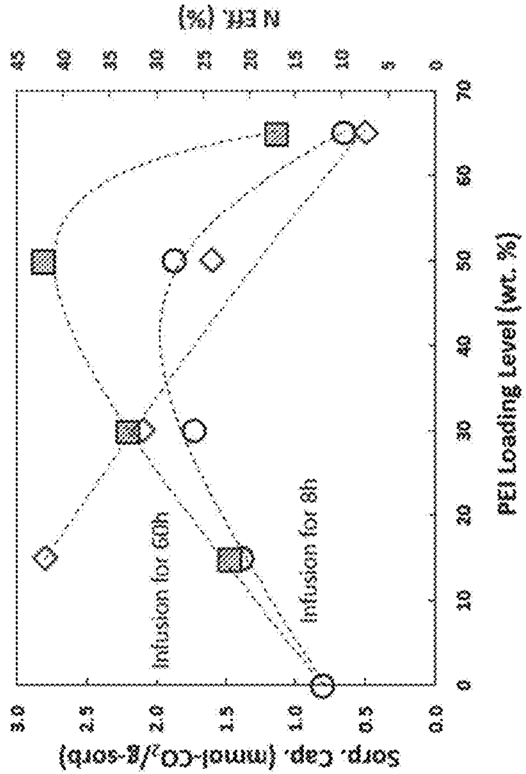
FIG. 10 shows sorption capacity plots for hollow fiber structures based on PIM-1 that are infused with polyethyleneimine.

To infuse PEI into spun PIM-1 fibers, the hollow fibers were soaked in a PEI/methanol solution for 3 hours, followed by solvent exchange with hexane and vacuum drying. Alternatively, dried hollow fibers were added to methanol solutions with well-defined quantities of PEI. These solutions were then covered and stirred overnight. After evaporation of methanol, the fibers were dried under vacuum at 40° C. overnight. FIG. 10 displays the loading of PEI into a PIM-1 hollow spun fiber and the resulting $CO_2$ capture performance (left vertical axis). Loadings of up to 65 wt % PEI were achieved via the aforementioned infusion processes. However, although high loadings of PEI could be achieved, the adsorption efficiency (right vertical axis) reached a maximum at roughly 50 wt % loading of PEI. The adsorption efficiency corresponds to the amount of adsorbed $CO_2$ divided by the amount of available amines (from the PEI loading) for $CO_2$ adsorption. As shown in FIG. 10, for PEI loadings greater than roughly 50 wt %, the efficiency starts to drop rapidly, indicating that relatively few of the amine sites are accessible and/or usable for $CO_2$ adsorption.

Without being bound by any particular theory, it is believed that part of the decrease in sorption capacity at higher PEI loadings is due to collapse of the pore structure of the PIM-1 as the PEI loading is increased to higher levels. This can be due to relaxing, swelling, and/or plasticizing of the PIM-1 as the loading of PEI is increased. In order to reduce or minimize this effect, it has been discovered that the pore structure of the PIM-1 can be at least partially stabilized by introducing aluminum oxide nanostrands into the PIM-1 structure. It is noted that this technique of infiltrating a polymer structure with aluminum oxide nanostrands could also be applied to polymeric structures formed by 3D printing and/or other additive manufacturing methods.

Small scale adsorption contactor structures were formed from PIM-1 via a 3D printing method. The PIM-1 samples were then soaked in methanol for 2 hours and then dried in a fume hood for 30 minutes. The PIM-1 samples were exposed to trimethylaluminum, water, trimethylaluminum, and water sequentially at 90° C. Each exposure lasted for 5 hours for thorough infiltration. PEI (Mw=800 Da) was then loaded into the 3D printed PIM-1 adsorber via wet impregnation. A methanol solution comprising 5 wt % or less PEI was filled into the adsorber module.

Figure 11:
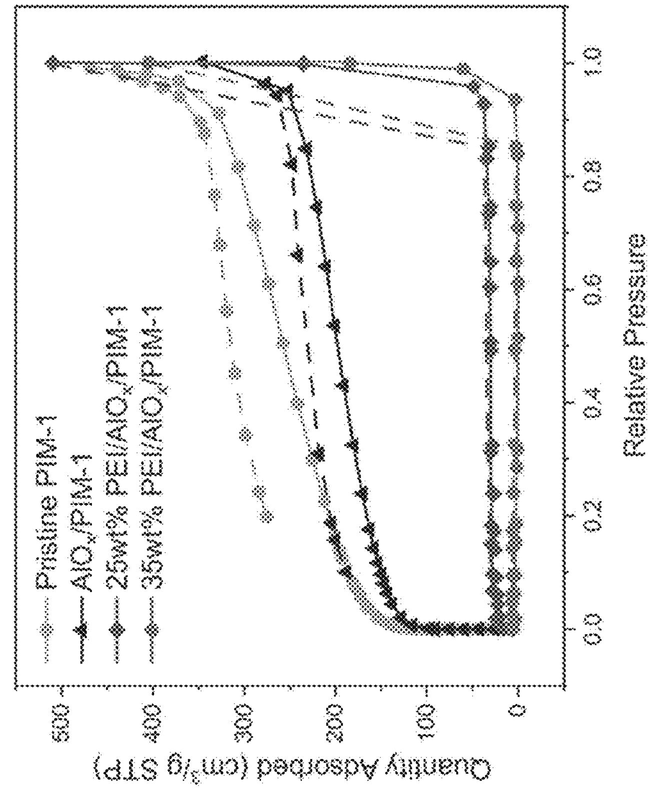
FIG. 11 shows adsorption isotherms for hollow fiber structures based on PIM-1 that include alumina oxide nanostrands and/or various amounts of infused polyethyleneimine.

The microporosity of PIM-1 and PIM-1-based composites were characterized via nitrogen physisorption at 77 K. FIG. 11 shows the nitrogen adsorption isotherm, while Table 11 provides the surface area, pore size, and pore volume values derived from the adsorption isotherm.

TABLE 11

| Characteristics of PIM-1 Structures | | | |
|---|---|---|---|
| Sample | BET Surface Area ($m^2$/g) | Pore Volume ($cm^3$/g) | Normalized Pore Volume ($cm^3/g_{PIM-1}$) |
| PIM-1 | 723 | 0.50 | 0.50 |
| $AlO_x$/PIM-1 | 597 | 0.41 | 0.47 |
| 25 wt % PEI/$AlO_x$/PIM-1 | 95 | 0.049 | 0.075 |
| 35 wt % PEI/$AlO_x$/PIM-1 | 32 | 0.005 | 0.009 |

As shown in FIG. 11, pristine PIM-1 exhibits a classical dual-mode nitrogen adsorption isotherm. The steep nitrogen adsorption curve at low-pressure range (relative pressure<0.05) indicates the interconnected micropores formed by the inefficient packing of the polymer backbone, while the following slow nitrogen adsorption is induced by the swelling effect induced by guest nitrogen molecules. For the examples shown in FIG. 11 and Table 11, the $AlO_x$/PIM-1 fibers contained 13 wt % $AlO_x$ and 87 wt % PIM-1.

During the wet impregnation process, PEI is expected to diffuse through the swollen microporous support and fill the mesopores and micropores. Based on the pore volume (0.47 $cm^3$/g) of $AlO_x$/PIM-1 fibers, the maximum theoretical loading of PEI is roughly 33 wt %. As expected, the impregnation of PEI inevitably leads to reduced BET surface areas, lower nitrogen physisorption, and smaller pore volume. As expected, the infiltrated $AlO_x$ nanostrands occupy spaces in the PIM-1 micropores, reducing the total pore volume from 0.50 $cm^3$/g to 0.41 $cm^3$/g. However, when the pore volume is normalized by the mass of PIM-1 instead of the whole composite, the pore volume shrinkage is not as significant as it appears. As shown in Table 11, 1 gram of PIM-1 provides 0.50 $cm^3$ pore volume in the pristine state, and it provides 0.47 $cm^3$ pore volume when intertwined with $AlO_x$ nanostrands. Considering the error associated with the characterization technique and potential polymer swelling, the difference in normalized pore volumes is negligible.

Thus, the aluminum oxide does not substantially interfere with the ability to subsequently introduce PEI into the pore structure of the PIM-1. This result suggests that the flexible PIM-1 micropores swell in vapor phase infusion precursor vapors to accommodate the $AlO_x$ nanostrands, so that the accessible pore volume after $AlO_x$ inclusion remains similar to the accessible pore volume prior to $AlO_x$ inclusion.

The infiltrated $AlO_x$ nanostrands exhibit a limited influence on the $CO_2$ adsorption performance Measured $CO_2$ adsorption isotherms for PIM-1 and $AlO_x$/PIM-1 were found to be almost identical. However, $AlO_x$ significantly improved the $CO_2$ capacity of PEI/$AlO_x$/PIM-1 composite. Given the same PEI loading, PEI/$AlO_x$/PIM-1 composites exhibit a 30% to 100% capacity increase compared with PEI/PIM-1 composites. For example, $CO_2$ capacities were measured for different samples at 35° C. and 76 mm Hg (which simulates flue gas generated by coal-fired plants). As PEI loading increased from 15 wt % to 35 wt %, the $CO_2$ capacity for PEI/PIM-1 composites increased from 0.41 mmol/g to 0.80 mmol/g while the $CO_2$ capacity for PEI/$AlO_x$/PIM-1 composites increased from 0.96 mmol/g to 1.19 mmol/g. The infiltrated $AlO_x$ also increased the amine efficiency ($CO_2$ adsorption quantity normalized by nitrogen atom quantity) of PEI distributed in PIM-1. Amine efficiencies are calculated by normalizing the $CO_2$ adsorption isotherm with the nitrogen atom quantity of PEI.

It is noted that further increasing PEI loading to 41 wt % decreased the $CO_2$ capacity of PEI/$AlO_x$/PIM-1, suggesting that excess PEI molecules accumulated at the external surface of the $AlO_x$/PIM-1 fibers and inhibited the exposure of amine groups to $CO_2$.

Example 9—Retention of Adsorption Profiles

In some aspects, after incorporating a MOF material into a sorbent fiber, the adsorption isotherm/isobar for the sorbent fiber can substantially retain the shape of the adsorption isotherm/isobar for the underlying MOF material. The absolute capacity of the sorbent fiber may be lower than the capacity of the MOF material alone, but features such as steps in the adsorption isotherm/isobar can be retained.

Figure 14:
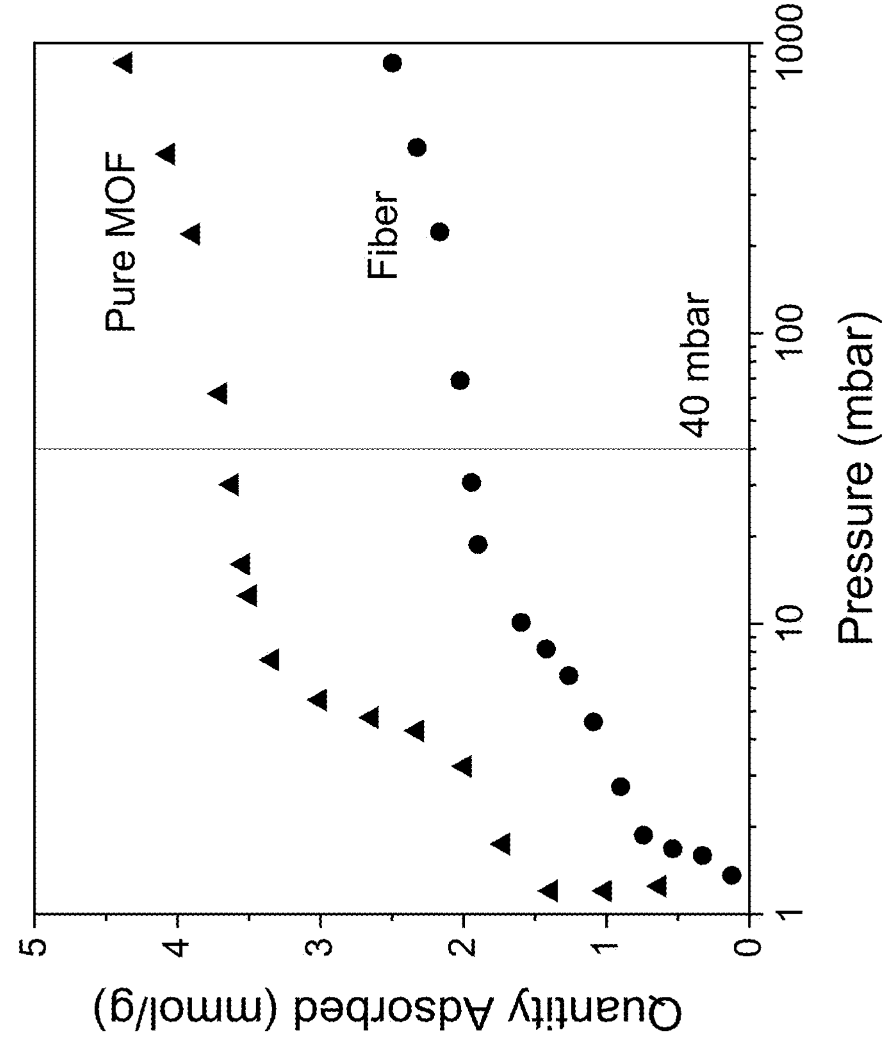
FIG. 14 shows adsorption isotherms for EMM-44 and a hollow fiber structure composed of polyethersulfone and EMM-44.

FIG. 14 shows adsorption isotherms for EMM-44 and a hollow fiber structure composed of polyethersulfone and EMM-44. The hollow fiber structure used to generate the data in FIG. 14 contained 68 wt % EMM-44, with the balance of the weight corresponding to polyethersulfone. As shown in FIG. 14, on a per weight basis, the sorption capacity of the fiber structure is lower than the sorption capacity of the neat MOF (EMM-44). However, the shape of the adsorption isotherm for the fiber is otherwise similar to the shape of the adsorption isotherm for the neat MOF material.

Figures 15, 16:
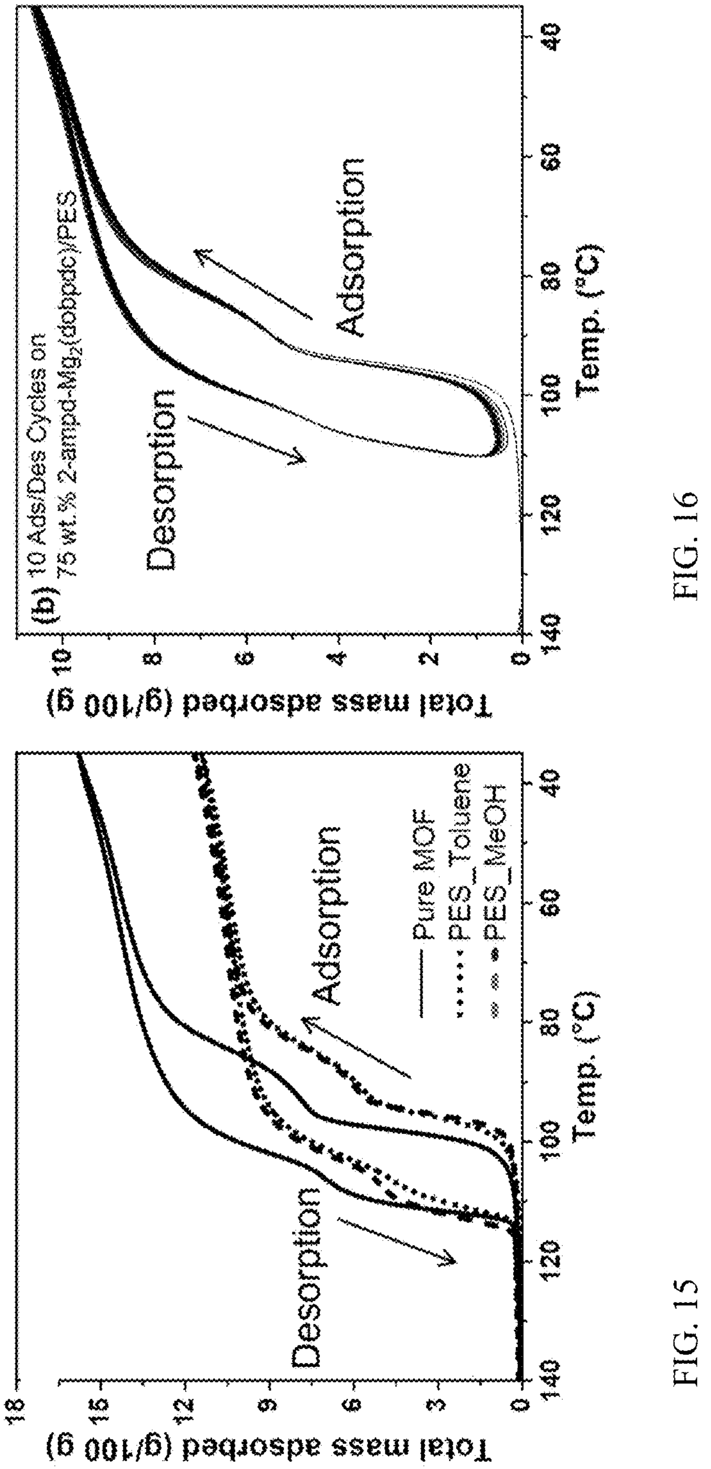
FIG. 15 shows adsorption isobars for fibers containing polyethersulfone and EMM-44.
FIG. 16 shows thermogravimetric analysis data for fibers containing polyethersulfone and EMM-44.
Figure 17:
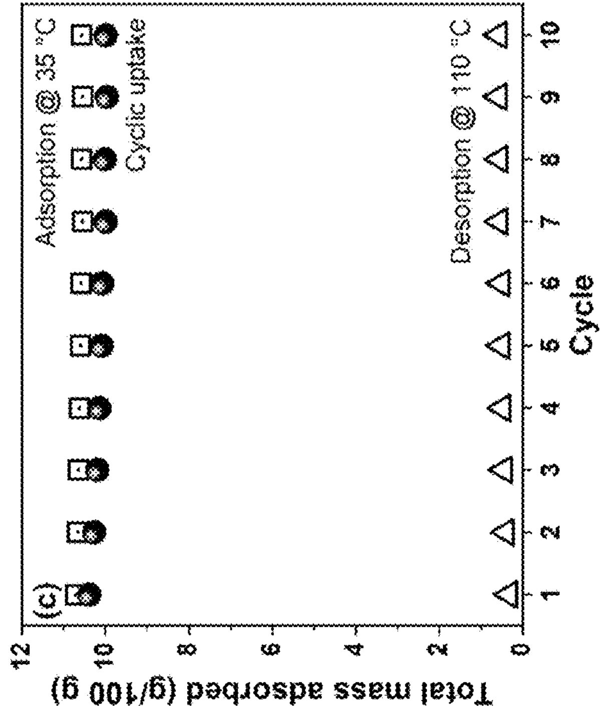
FIG. 17 shows thermogravimetric analysis data for fibers containing polyethersulfone and EMM-44.

FIG. 15, FIG. 16, and FIG. 17 show additional data demonstrating the qualitative similarity in the sorption properties of fiber structures that include a MOF material and the neat MOF material. FIG. 15 corresponds to adsorption and desorption isobars for EMM-44 and for syringe extruded fibers composed of polyethersulfone and EMM-44. The extruded fibers were infused with 2-ampd using either toluene or methanol as the solvent. As shown in FIG. 15, the solvent used in the infusion solution had little or no impact on the shape of the adsorption and desorption isobars. Additionally, similar to FIG. 14, the shape of the adsorption and desorption isobar for the syringe extruded fibers was similar to the shape of the adsorption and desorption isotherm for the neat MOF material.

FIG. 16 shows thermogravimetric analysis (TGA) data for adsorption and desorption for a syringe extruded fiber composed of polyethersulfone and EMM-44. In FIG. 16, 10 cycles of adsorption and desorption were performed, and the data from each cycle is overlaid in the plot. As shown in FIG. 16, the fiber maintained substantially the same adsorption and desorption profile over the 10 cycles. Thus, no aging effects were observed after 10 cycles. FIG. 17 shows $CO_2$ uptake at 35° C., $CO_2$ desorption at 110° C., and cyclic uptake for the 10 cycles shown in FIG. 16.

Example 10—Co-Extrusion of Barrier Layer

Using a 3-channel spinneret, a polyethersulfone (PES) barrier layer dope was co-extruded with an outer PES/sorbent dope to produce a dual-layer hollow fiber with a barrier layer using one-step co-extrusion spinning at 50° C. and dry-jet wet-quenching in water at 20-50° C. with an air gap of 1-10 cm. The barrier layer dope contained 20-40 wt % PES with the balance corresponding to NMP. The dope solution for forming the fiber contained 10-20 wt % PES, 10-20 wt % of sorbent particles (i.e., metal organic framework sorbent), and 1-5 wt % of $LiNO_3$ as a pore-former, with the balance of the solution corresponding to NMP. The bore fluid was 80-100% Polypropylene Glycol (PPG), with the balance corresponding to water. The flow rates of bore fluid, barrier layer dope, and dope solution for forming the fiber were adjusted, along with adjustment of the speed of the take-up drum, in order to obtain a fiber having an outer diameter of roughly 800 μm, an inner diameter of roughly 400 μm, and a barrier layer between the inner bore and the sorbent fiber of roughly 4-10 μm. The as-spun fiber was collected on a rotating drum, and then solvent exchanged in water and methanol sequentially to obtain a fiber with the desired morphology and sorbent content (60~75%). An SEM micrograph of the fiber cross-section was obtained for some of the fibers, and showed a dense barrier layer having a thickness of 4-20 μm, and a sorbent fiber having a thickness of 200-300 μm.

Additional Embodiments

Embodiment 1. A sorbent fiber composition, comprising: a fiber comprising a polymeric structural material, the polymeric structural material comprising a polymer and 5.0 wt % to 80 wt % of a metal organic framework material relative to a weight of the polymeric structural material.

Embodiment 2. The sorbent fiber composition of Embodiment 1, wherein the fiber comprises a hollow fiber, the hollow fiber comprising a bore within the hollow fiber.

Embodiment 3. The sorbent fiber composition of Embodiment 2, wherein the hollow fiber further comprises a barrier layer at an interface between the bore and the polymeric structural material, the barrier layer comprising a different polymer than the polymeric structural material, the barrier layer optionally comprising a permeance for $N_2$ of 100 GPU or less.

Embodiment 4. The sorbent fiber composition of any of the above embodiments, wherein the polymer comprises a polymer of intrinsic microporosity, AO-PIM-1, polyethersulfone, or a combination thereof.

Embodiment 5. The sorbent fiber composition of any of the above embodiments, wherein the polymer comprises a polymer backbone that comprises at least a portion of one or more ring structures.

Embodiment 6. The sorbent fiber composition of any of the above embodiments, wherein the metal organic framework material comprises one or more appended amines, or wherein the sorbent fiber composition comprises a Type V adsorption isotherm for $CO_2$, or a combination thereof.

Embodiment 7. The sorbent fiber composition of any of the above embodiments, a) wherein the metal organic framework material comprises MOF-274, EMM-44, EMM-67, or a combination thereof, b) wherein the metal organic framework material comprises a disalicylate linker, or c) a combination of a) and b).

Embodiment 8. The sorbent fiber composition of any of the above embodiments, wherein the fiber comprises 30 wt % or more of the metal organic framework material.

Embodiment 9. The sorbent fiber composition of any of the above embodiments, wherein the polymeric structural material comprises a plurality of polymers.

Embodiment 10. A method for forming a sorbent fiber composition according to any of Embodiments 1-9, the method comprising: forming a fiber by extruding a dope solution comprising a metal organic framework material, a polymer, and a solvent.

Embodiment 11. The method of Embodiment 10, wherein forming a fiber comprises forming a hollow fiber by extruding a bore fluid and the dope solution.

Embodiment 12. The method of Embodiment 11, wherein the method further comprises forming a barrier layer at an interface between the bore and the polymeric structural material, the barrier layer optionally comprising a permeance for $N_2$ of 100 GPU or less.

Embodiment 13. The method of Embodiment 12, i) wherein forming the barrier layer comprises passing a barrier polymer and a carrier gas through the bore to form a barrier layer at an interface between the bore and the polymeric structural material, the carrier gas comprising 0.5 vol % or less of $H_2O$, wherein optionally during at least a portion of the passing the barrier polymer and the carrier gas through the bore, a pressure in the polymeric structural material is lower than a pressure within the bore by 10 kPa-a or more; ii) wherein forming the barrier layer comprises co-extruding the barrier layer during the forming of the hollow fiber; or iii) a combination of i) and ii).

Embodiment 14. The method of any of Embodiments 10 to 13, wherein the dope solution further comprises a non-solvent, a pore forming component, or a combination thereof.

Embodiment 15. The method of any of Embodiments 10 to 14, wherein the method further comprising exposing the hollow fiber to a solution comprising an amine to convert at least a portion of the metal organic framework materials to amine-appended metal organic framework materials.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A sorbent fiber composition, comprising:

a fiber comprising a polymeric structural material, the polymeric structural material comprising a polymer and 50 wt % to 80 wt % of EMM-67 relative to a weight of the polymeric structural material, wherein the polymer comprises a polymer of intrinsic microporosity, AO-PIM-1, or a combination thereof, and wherein the EMM-67 retains at least 80% of its $CO_2$ adsorption capacity when incorporated into the polymeric structural material.

2. The sorbent fiber composition of claim 1, wherein the fiber comprises a hollow fiber, the hollow fiber comprising a bore within the hollow fiber.

3. The sorbent fiber composition of claim 2, wherein the hollow fiber further comprises a barrier layer at an interface between the bore and the polymeric structural material, the barrier layer comprising a different polymer than the polymeric structural material and having a permeance for $N_2$ of 100 GPU or less.

4. The sorbent fiber composition of claim 1, wherein the polymer further comprises a polyimine.

5. The sorbent fiber composition of claim 1, wherein the polymer comprises a polymer backbone that comprises at least a portion of one or more ring structures.

6. The sorbent fiber composition of claim 1, wherein the polymeric structural material further comprises one or more appended amines.

7. The sorbent fiber composition of claim 1, wherein the sorbent fiber composition comprises a Type V adsorption isotherm for $CO_2$.

8. The sorbent fiber composition of claim 1, a) wherein the polymeric structural material further comprises EMM-44; b) wherein the polymeric structural material further comprises a disalicylate linker; or c) a combination of a) and b).

9. The sorbent fiber composition of claim 1, wherein the polymeric structural material comprises a plurality of polymers.

10. The sorbent fiber composition of claim 1, wherein the fiber comprises 30 wt % or more of the EMM-67.

11. A method of appending amines to a metal organic framework material, the method comprising:

forming a hollow fiber structure comprising the sorbent fiber composition of claim 1; and after forming the hollow fiber structure, contacting the hollow fiber structure with a solution comprising an amine thereby appending the amine to the EMM-67.

12. The method of claim 11, wherein the amine comprises 2-aminomethylpiperidine (2-ampd).

13. The method of claim 12, wherein the solution comprises 25 wt % of 2-aminomethylpiperidine (2-ampd) in methanol.

14. The method of claim 11, wherein the solution comprises between 10 vol % to 40 vol % of the amine relative to a volume of the solution.

15. A sorbent fiber composition, comprising:

a fiber comprising a polymeric structural material, the polymeric structural material comprising a polymer and 50 wt % to 80 wt % of EMM-67 relative to a weight of the polymeric structural material, wherein the polymer comprises polyethersulfone.

16. The sorbent fiber composition of claim 15, wherein the polymeric structural material further comprises a disalicylate linker.

17. The sorbent fiber composition of claim 15, wherein the fiber comprises a hollow fiber, the hollow fiber comprising a bore within the hollow fiber.

18. The sorbent fiber composition of claim 17, wherein the hollow fiber further comprises a barrier layer at an interface between the bore and the polymeric structural material, the barrier layer comprising a different polymer than the polymeric structural material.

19. The sorbent fiber composition of claim 18, wherein the barrier layer comprises a permeance for $N_2$ of 100 GPU or less.

20. A sorbent fiber composition, comprising:

a fiber comprising a polymeric structural material, the polymeric structural material comprising a polymer and 50 wt % to 80 wt % of EMM-67 relative to a weight of the polymeric structural material, wherein the polymer consists of AO-PIM-1.

* * * * *